(12) United States Patent
Jing et al.

(10) Patent No.: US 6,844,030 B2
(45) Date of Patent: Jan. 18, 2005

(54) PROCESS FOR MODIFYING A POLYMERIC SURFACE

(75) Inventors: Naiyong Jing, Woodbury, MN (US); George Van Dyke Tiers, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 236 days.

(21) Appl. No.: 10/023,271

(22) Filed: Dec. 14, 2001

(65) Prior Publication Data

US 2003/0162022 A1 Aug. 28, 2003

(51) Int. Cl.$^7$ .................................................. C08F 2/46
(52) U.S. Cl. ..................... 427/508; 427/595; 428/421; 428/430; 428/435; 428/441; 428/473.5; 428/480; 428/523
(58) Field of Search ................................ 427/508, 595; 428/421, 430, 435, 441, 473.5, 480, 523

(56) References Cited

U.S. PATENT DOCUMENTS

| | | | |
|---|---|---|---|
| 2,789,063 A | 4/1957 | Purvis et al. | |
| 3,254,561 A | 6/1966 | Makas | |
| 3,376,278 A | 4/1968 | Morgan et al. | |
| 3,563,871 A | 2/1971 | Newman et al. | |
| 3,762,325 A | * 10/1973 | Hallman et al. | 101/453 |
| 4,112,139 A | 9/1978 | Shirk et al. | |
| 4,164,463 A | 8/1979 | Fang | |
| 4,186,084 A | 1/1980 | Fang | |
| 4,192,764 A | * 3/1980 | Madsen | 252/387 |
| 4,233,421 A | 11/1980 | Worm | |
| 4,261,800 A | 4/1981 | Beckenbaugh et al. | |
| 4,338,237 A | 7/1982 | Sulzbach et al. | |
| 4,567,241 A | 1/1986 | Kitchens et al. | |
| 4,613,653 A | 9/1986 | Kitchens et al. | |
| 4,775,449 A | 10/1988 | Dumas et al. | |
| 4,824,692 A | 4/1989 | Gillick et al. | |
| 4,912,171 A | 3/1990 | Grootaert et al. | |
| 5,051,312 A | 9/1991 | Allmer | |
| 5,075,427 A | 12/1991 | Kang et al. | |

(List continued on next page.)

FOREIGN PATENT DOCUMENTS

| | | |
|---|---|---|
| EP | 0769517 A1 | 4/1997 |
| JP | 06-279590 | 10/1994 |
| JP | 07-179628 | 7/1995 |
| JP | 07-179636 | 7/1995 |
| JP | 09-193164 | 7/1997 |
| JP | 2000-256488 | 9/2000 |
| WO | WO 96/05965 A1 | 2/1996 |

OTHER PUBLICATIONS

Küper et al., "Ablation of polytetrafluoroethylene (Teflon) with femtosecond UV excimer laser pulses", Appl. Phys. Lett., 54 (1), Jan. 2, 1989, ©1988 American Institute of Physics, pp. 4–6.

Yao et al., "Anodic Voltammetry and ESR Studies of P–Phenylendediamine and Some of its Derivatives in Acetonitrile", Chemistry Letters, 1974, pp. 939–944.

Siperko et al., "Chemical and physical modification of fluoropolymer surfaces for adhesion enhancement: a review", J. Adhesion Sci. Technol., vol. 3, No. 3, pp. 157–173, 1989.

(List continued on next page.)

*Primary Examiner*—James J. Siedleck
*Assistant Examiner*—Melanie Bissett

(57) ABSTRACT

This invention concerns a process for modifying a polymeric substrate by contacting the surface with a photoreactive solution of an inorganic photochemical electron donor while irradiating the surface with actinic radiation. Patterns of modified and unmodified surfaces can be produced. Polymeric substrates with modified surfaces may be effectively bonded to polymer films to form composite articles. The process has particular applicability to the surface modification of fluorinated polymers.

42 Claims, 1 Drawing Sheet

U.S. PATENT DOCUMENTS

| | | | |
|---|---|---|---|
| 5,086,123 A | 2/1992 | Guenthner et al. | |
| 5,262,490 A | 11/1993 | Kolb et al. | |
| 5,284,611 A | 2/1994 | Grootaert et al. | |
| 5,285,002 A | 2/1994 | Grootaert | |
| 5,320,789 A | 6/1994 | Nishii et al. | |
| 5,419,968 A | 5/1995 | Okada et al. | |
| 5,470,617 A | 11/1995 | Nishii et al. | |
| 5,478,652 A | 12/1995 | Grootaert et al. | |
| 5,580,616 A | 12/1996 | Niino et al. | |
| 5,656,121 A | 8/1997 | Fukushi | |
| 5,658,671 A | 8/1997 | Fukushi | |
| 5,734,085 A | 3/1998 | Coggio et al. | |
| 5,859,086 A | 1/1999 | Freund et al. | |
| 5,882,466 A | 3/1999 | Grootaert et al. | |
| 6,117,497 A | 9/2000 | Murahara et al. | |
| 6,255,384 B1 | 7/2001 | McCarthy et al. | |
| 2002/0197481 A1 * | 12/2002 | Jing et al. | 428/421 |
| 2003/0049455 A1 * | 3/2003 | Jing et al. | 428/421 |
| 2003/0077454 A1 * | 4/2003 | Jing | 428/421 |
| 2003/0159915 A1 * | 8/2003 | Jing et al. | 204/157.15 |

OTHER PUBLICATIONS

Chemlok®, "Chemlok® 607 Silicone Rubber and Specialty Elastomer Adhesive", No. 512, (2001), Lord Chemical Products.

Rye et al., "Depth Dependence of Alkali Etching of Poly(tetrafluoroethylene): Effect of X-ray Radiation", Langmuir 1989, 5, pp. 1331–1334.

Mazur et al., "Electrochemical Growth of Metal Interlayers in Polyimide Film," J. Phys. Chem. 1986, 90, pp. 1365–1372.

Barker et al., "The Electrochemical Reduction of Polytetrafluoroethylene," Electrochimica Acta, 1978, vol. 23, pp. 1107–1110.

Okada et al., "Endowment with the Wettability on the Surface of Tetrafluoroethylene–Perfluoroalkyl Vinyl Ether Copolymer by Excimer Laser Irradiation", Chemistry Letters, pp. 1637–1638, 1993, ©1993 The Chemical Society of Japan.

Révész et al., "Excimer laser induced surface chemical modification of polytetrafluoroethylene", Elsevier, Applied Surface Science 109/110 (1997), pp. 222–226.

Meyer et al., "Metallization of Polytetrafluoroethylene (PTFE) by Means of Plasma–enhanced Chemical Vapour Deposition", Metallized Plastics 2, Fundamental and Applied Aspects, Plenum Press, NY, 1991, pp. 121–129.

MacNicol et al., "New and unexpected reactivity of saturated fluorocarbons", Letters to Nature, Nature, vol. 332, Mar. 3, 1988, pp. 59–61.

Burdeniuc et al., "New Reaction of Saturated Fluorocarbons: Partial Reduction by $NH_3$ with Hg Photosensitization", J. Am. Chem. Soc., 1995, 117, pp. 10119–10120.

Burdeniuc et al., "Mineralization of Chlorofluorocarbons and Aromatization of Saturated Fluorocarbons by a Convenient Thermal Process", Science, vol. 271, Jan. 19, 1996, pp. 340–341.

D. F. Evans "Perturbation of Singlet–Triplet Transitions of Aromatic Molecules by Oxygen under Pressure", Journal of the Chemical Society (London), 1957, pp. 1351–1357.

Allmer et al., "Photochemical Modification of a Fluoropolymer Surface", Macromolecules, 1991, 24, pp. 5487–5488.

Kaprinidis et al., "Photosensitized Defluorination of Saturated Perfluorocarbons", Pergamon, Tetrahedron Letters, vol. 37, No. 14, pp. 2373–2376, 1996.

Burggraaf, "Pick Your Plastic Pipe Carefully—Chemicals, even water, can degrade some plastics", Semiconductor International, Jul. 1988, pp. 54–58.

Weissman, "Paramagnetic Resonance Spectra of Wurster's Free Radical Ions", Journal Phys. Chem., 1954, vol. 22, pp. 1135–1136.

Iqbal et al., "Polyacetylene Formed by the Benzoin Dianion Reduction of Poly(tetrafluoroethylene)", Macromolecules, 1986, 19, pp. 2992–2996.

Niino et al., "Positively charged surface potential of polymer films after excimer laser ablation: Application to selective–area electroless plating on the ablated films", Appl. Phys. Lett. 60 (21), May 25, 1992.

Brewis et al., "Reactions of Polytetrafluoroethylene with Electrochemically Generated Intermediates", Die Angewandte Makromolekulare Chemie, 43, (1975), pp. 191–194 (Nr. 659).

Marsella et al., "Selective Reduction of Saturated Perfluorocarbons", J. Org. Chem., 1992, 57, pp. 2856–2860.

E.P. Plueddemann, "Silane Coupling Agents", Second Edition, Plenum Press, NY, 1991, pp. 101–113.

E.P. Plueddemann, "Silane Coupling Agents", Plenum Press, NY, 1982, pp. 188–205.

Brewis, "Surface Analysis and Pretreatment of Plastics and Metals", Applied Science Publishers, NY, 1982, pp. 1–11.

Niino et al., "Surface modification and metallization of fluorocarbon polymers by excimer laser processing", Appl. Phys. Lett., 63, (25), Dec. 20, 1993.

Clark et al., "Surface Modification by Plasma Techniques. I. The Interactions of a Hydrogen Plasma with Fluoropolymer Surfaces", Journal Polym. Sci., Polym. Chem. Ed., 1987, vol. 25, pp. 2643–2664.

Nishii et al., "Surface Modification of Polytetrafluoroethylene by KrF–Laser Irradiation", Chemistry Letters, pp. 2089–2090, 1992, ©1992 The Chemical Society of Japan.

Nishii et al., "Surface Modification of Polytetrafluoroethylene Containing Carbonaceous Materials by KrF–Laser Irradiation", Chemistry Letters, pp. 1063–1066, 1993, ©1993 The Chemical Society of Japan.

Costello et al., "Surface Modification of Poly(tetrafluoroethylene) with Benzoin Dianion", Macromolecules, 1984, 17, pp. 2940–2942.

Kiplinger et al., Chem. Rev., 1994, vol. 94, No. 2, p. 341.

Cooper et al., "Theoretical Studies of Fluorocarbons—Part III. Primary, Secondary, Tertiary and Quaternary Centres", Journal of Fluorine Chemistry, 49, (1990), pp. 421–432.

Noh et al., "Surface Modification of Poly(tetrafluoroethylene) with Benzophenone and Sodium Hydride by Ultraviolet Irradiation", J. Poly. Sci. A: Polym. Chem. Ed. 35 (1997), pp. 1499–1514.

\* cited by examiner

PROCESS FOR MODIFYING A POLYMERIC SURFACE

TECHNICAL FIELD

The invention relates to processes for surface modification of polymeric materials by exposure to actinic radiation while in contact with inorganic compounds, and bonded articles derived thereby.

BACKGROUND

Polymer surfaces have been modified by exposure to ultraviolet and/or visible radiation while such surfaces are in contact with selected compounds (i.e., modifiers). In some cases, those compounds are organic, and are selected for their ability to participate in electron transfer reactions with a polymer film and/or sensitizer. The resultant modified polymer surface typically has organic residues corresponding to the selected organic compounds covalently bonded to the polymer film. Such residues, being organic, may be colored and/or may have a tendency to oxidize when exposed to atmospheric oxygen causing a change in one or more properties (e.g., surface energy) of the surface over time. This may be especially important for polymer films, such as fluorine-containing polymer (i.e., fluoropolymer) films, that may not otherwise oxidize under ambient conditions.

It would be desirable to have processes, capable of permanently modifying the surface of a polymeric substrate, such that the surface is not prone to discoloration and/or oxidation for long periods of time.

Fluoropolymers are a commercially useful class of materials. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers, such as hexafluoropropylene, have particular utility in high temperature applications, such as seals, gaskets, and linings.

Surface modification of fluoropolymers using inorganic compounds may be relatively slow and or difficult to carry out (e.g., involving many process steps). It would be desirable to have methods for enhancing the rate of such processes and the ease with which they may be carried out.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, it is often difficult to establish high bond strengths when one of the layers is a fluoropolymer, in part, because of the non-adhesive qualities of fluoropolymers.

It would be desirable to have methods for improving the strength of adhesive bonds to polymeric substrates.

SUMMARY OF THE INVENTION

The invention concerns novel processes for modifying the surface of a polymeric substrate. The modified polymeric substrates are useful in the manufacture of various articles.

In one aspect, the invention provides a process for modifying a polymeric substrate surface comprising:
 a) providing a polymeric substrate having first and second major surfaces;
 b) contacting a photoreactive solution comprising at least one solvent and at least one inorganic photochemical electron donor with the first major surface to form an interface, wherein the second major surface remains substantially uncoated by the photoreactive solution; and
 c) exposing the interface to actinic radiation;
wherein the inorganic photochemical electron donor comprises a soluble non-volatile salt.

In some embodiments, the inorganic photochemical electron donor comprises at least one atom selected from the group consisting of sulfur, nitrogen, and phosphorus. For example, the inorganic photochemical electron donor may comprise a soluble non-volatile salt selected from the group consisting of alkali metal thiocyanates, alkali metal sulfides, alkali metal hydrosulfides, alkali metal disulfides, alkali metal tetrasulfides, alkali metal thiocarbonates, alkali metal thiooxalates, alkali metal thiophosphates, alkali metal thiosulfates, alkali metal dithionites, alkali metal sulfites; alkali metal selenocyanates, alkali metal selenides, alkali metal azides, alkali metal iodides, and alkali metal triiodides.

In some embodiments, the polymeric substrate comprises fluoropolymer, polyimide, or polyester.

In some embodiments, the process further comprises bonding the exposed interface to a second substrate. Desirably the second substrate may be a polymer film.

In another aspect, the invention provides a polymeric substrate having a modified surface prepared according to a process comprising:
 a) providing a polymeric substrate having first and second major surfaces;
 b) contacting a photoreactive solution comprising at least one solvent and at least one inorganic photochemical electron donor with the first major surface to form an interface, wherein the second major surface remains substantially uncoated by the photoreactive solution; and
 c) exposing the interface to actinic radiation;
wherein the inorganic photochemical electron donor comprises a soluble non-volatile salt.

In another aspect, the invention provides a polymeric substrate having a surface preparable by a process for modifying a polymeric substrate surface comprising:
 a) providing a polymeric substrate having a surface;
 b) contacting a photoreactive solution comprising solvent and at least one inorganic photochemical electron donor with the polymeric substrate surface to form an interface; and
 c) exposing the interface to actinic radiation;
wherein the inorganic photochemical electron donor comprises a soluble non-volatile salt.

In another aspect, the invention provides a process for preparing a composite article comprising:
 a) providing a polymeric substrate having a surface;
 b) providing a second substrate having a surface;
 c) coating a photoreactive solution comprising solvent and at least one inorganic photochemical electron donor as a thin film onto the surface of the polymeric substrate to form a first interface;
 d) contacting the surface of the second substrate with the coated photoreactive solution to form a second interface; and e) simultaneously exposing the first and second interfaces to actinic radiation sufficient to form a composite article.

In some embodiments of this aspect of the invention, the inorganic photochemical electron donor is selected from the group consisting of thiocyanate salts, sulfide salts, hydrosulfide salts, disulfide salts, tetrasulfide salts, thiocarbonate salts, thiooxalate salts, thiophosphate salts, thiosulfate salts, dithionite salts, selenocyanate salts, selenide salts, azide salts, iodide salts, and triiodide salts.

In some embodiments, the second substrate is a polymer film.

In another aspect, the invention provides a composite article prepared by a process comprising:
a) providing a polymeric substrate having a surface;
b) providing a second substrate having a surface;
c) coating a photoreactive solution comprising solvent and at least one inorganic photochemical electron donor as a thin film onto the surface of the polymeric substrate to form a first interface;
d) contacting the surface of the second substrate with the coated photoreactive solution to form a second interface; and
e) simultaneously exposing the first and second interfaces to actinic radiation sufficient to form a composite article.

In another aspect, the invention provides a composite article preparable by a process comprising:
a) providing a polymeric substrate having a surface;
b) providing a second substrate having a surface;
c) coating a photoreactive solution comprising solvent and at least one inorganic photochemical electron donor as a thin film onto the surface of the polymeric substrate to form a first interface;
d) contacting the surface of the second substrate with the coated photoreactive solution to form a second interface; and
e) simultaneously exposing the first and second interfaces to actinic radiation sufficient to form a composite article.

Polymeric substrates, that are surface-modified according to various aspects of the invention, typically exhibit improved adhesion when bonded to another solid substrate and are useful for preparation of various composite articles. Also, organic polymeric substrates having surfaces modified according to various aspects of the invention may be used to bind or absorb various species, such as biologically active molecules, electrolessly plated metal films, adhesives (including pressure-sensitive adhesives), and the like. Since by masking a portion of the actinic radiation the methods of the invention may be used to produce patterns in an imagewise manner on the polymeric substrate, they may be useful in printing processes, and in the manufacture of electronic articles.

As used in this application:

"actinic radiation" means light having a wavelength of from about 200 nanometers to about 400 nanometers;

"cured" means covalently cross-linked;

"elastomer" means a material that has resiliency properties similar to those of rubber; in particular, the term elastomer reflects the property of the material to undergo a substantial stress elongation and then return to substantially its original dimensions upon release of the stress elongating the elastomer;

"inorganic" means having neither a C—H bond, nor a carbon to carbon multiple bond, nor a tetracoordinate carbon atom; in embodiments of the invention in which an inorganic photochemical electron donor is ionic, the term "inorganic" refers to the anionic portion of the ionic compound only, that is, the cationic portion of the ionic compound, which is present of necessity to maintain the overall charge balance, may therefore be organic as in the case of, for example, tetraalkylammonium thiocyanate;

"non-volatile salt" refers to a salt consisting of a cation and an anion, wherein the cation, and any corresponding conjugate base that may exist in equilibrium with the cation, have a combined vapor pressure of less than about 10 millipascals at 25° C.;

"organic" means not inorganic as defined herein;

"photochemical electron donor" refers to a compound that undergoes photochemical one-electron oxidation;

"soluble" means dissolvable in the chosen solvent at concentrations exceeding about 0.001 mole per liter;

"thermoplastic" refers to a polymer that softens and flows when exposed to heat and solidifies when cooled to room temperature; and "thermoset" refers to a polymeric material, optionally containing a curing agent, that solidifies or "sets" irreversibly with respect to heat when cured.

DETAILED DESCRIPTION OF THE DESIRABLE EMBODIMENTS

The invention concerns processes for modifying a polymeric substrate surface and articles derived thereby.

In various aspects, the invention concerns processes that involve contacting a photoreactive solution comprising solvent, at least one inorganic photochemical electron donor and, optionally, at least one cationic assistant with a surface of a polymeric substrate to form an interface, and subsequently exposing the interface to actinic radiation.

In some embodiments of the invention, the resulting surface-modified polymeric substrate may be bonded to a second substrate to form a composite article.

Figure 1:
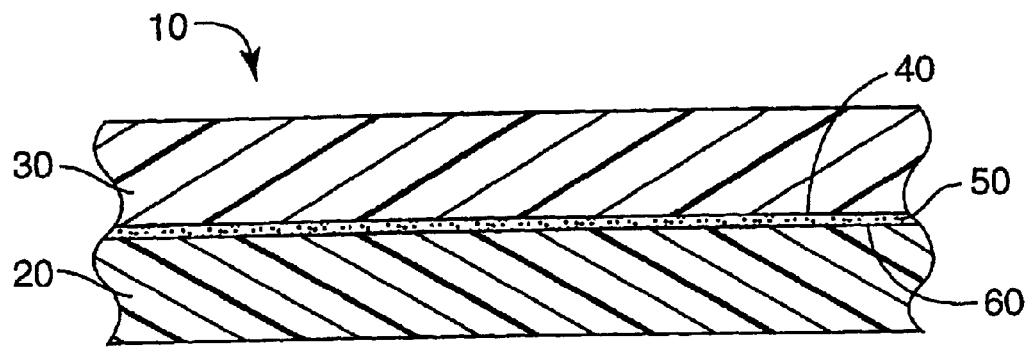
FIG. 1 is a cross-sectional view of a composite article prepared according to one embodiment of the invention.

Referring to FIG. 1, a composite article 10 comprises a polymeric substrate 20 having a surface layer 50. Surface layer 50 is the result of contacting a photoreactive solution comprising solvent, at least one inorganic photochemical electron donor, and at least one cationic assistant with a polymeric substrate surface 60 to form an interface, and subsequently exposing the interface to actinic radiation. A surface 40 of a second substrate 30 is bonded to surface layer 50 to form composite article 10. Surface layer 50 typically has a thickness on the order of molecular dimensions, for example, 10 nanometers or less.

Polymeric Substrate

Polymeric substrates that may be modified according to the methods of the invention typically comprise polymeric organic material, and may be of any shape, form, or size. The polymeric organic material may be thermoplastic, thermoset, elastomeric, or other. Any polymeric organic material may be used in processes of the invention, provided the limitation concerning its reduction potential (below) is met. Desirable polymeric organic materials include polyimides, polyesters, and fluoropolymers (i.e., those organic polymers containing less than 3.2 percent by weight hydrogen, and which may contain chlorine or bromine atoms in place of some of the fluorine atoms).

The processes of the invention may be especially advantageous when the polymeric organic material is a fluoropolymer, since there are relatively few simple methods for modifying such polymers. Desirably, polymers are homopolymers and copolymers of tetrafluoroethylene (i.e., TFE). More desirably, the polymeric organic material is a copolymer of TFE.

In some embodiments, the polymeric organic material may have a glass transition temperature and/or crystalline melting point above ambient temperature (plastics). In other embodiments, the polymeric organic material may be elastomeric.

In some desired embodiments, the polymeric organic material comprises at least one fluoropolymer. The fluoropolymer may be a perfluorinated polymer or a partially fluorinated polymer. For example, the fluoropolymer may be either melt-processable, such as in the case of polyvinylidene fluoride (i.e., PVDF); a terpolymer of tetrafluoroethylene, hexafluoropropylene and vinylidene fluoride (i.e., THV); a tetrafluoroethylene-hexafluoropropene copolymer; and other melt-processable fluoroplastics; or the fluoropolymer may not be melt-processable, such as in the case of polytetrafluoroethylene, modified polytetrafluoroethylene copolymers (e.g., copolymers of TFE and low levels of fluorinated vinyl ethers), and cured fluoroelastomers.

Fluoroelastomers may be processed, before they are cured, by injection or compression molding or other methods normally associated with thermoplastics. Fluoroelastomers after curing or crosslinking may not be able to be further melt-processed. Fluoroelastomers may be coated out of solvent in their uncrosslinked form. Fluoropolymers may also be coated from an aqueous dispersion form. In desirable embodiments, the fluoropolymer may be a tetrafluoroethylene-hexafluoropropene copolymer, a tetrafluoroethylene-perfluoro (alkyl vinyl ether) copolymer (e.g., tetrafluoroethylene-perfluoro (propyl vinyl ether)), a perfluoroelastomer, or mixtures thereof.

Desirably, the fluoropolymer may be a material that is capable of being extruded or solvent coated. Such fluoropolymers typically are fluoroplastics that have melting temperatures ranging from about 100° C. to about 330° C., more desirably from about 150° C. to about 270° C. Desirable fluoroplastics include interpolymerized units derived from vinylidene fluoride (i.e., VDF) and/or TFE, and may further include interpolymerized units derived from other fluorine-containing monomers, non-fluorine-containing monomers, or a combination thereof.

Exemplary suitable fluorine-containing monomers include TFE, hexafluoropropylene (i.e., HFP), chlorotrifluoroethylene, 3-chloropentafluoropropene, perfluorinated vinyl ethers (e.g., perfluoroalkoxy vinyl ethers, such as $CF_3OCF_2CF_2CF_2OCF=CF_2$; and perfluoroalkyl vinyl ethers, such as $CF_3OCF=CF_2$ and $CF_3CF_2CF_2OCF=CF_2$), and fluorine-containing di-olefins, such as perfluorodiallyl ether and perfluoro-1,3-butadiene. Examples of suitable non-fluorine-containing monomers include olefin monomers, such as ethylene, propylene, and the like.

The VDF-containing fluoropolymers can be prepared using emulsion polymerization techniques as described, for example, in U.S. Pat. No. 4,338,237 (Sulzbach et al.) or U.S. Pat. No. 5,285,002 (Grootaert), herein incorporated by reference. Exemplary commercially available VDF-containing fluoroplastics include those fluoropolymers having the trade designations DYNEON THV 200, THV 400, THVG, and THV 610x(available from Dyneon, St. Paul, Minn.), KYNAR 740 (available from Atochem North America, Philadelphia, Pa.), HYLAR 700 (available from Ausimont USA, Inc., Morristown, N.J.), and FLUOREL FC-2178 (available from Dyneon).

A particularly useful fluoropolymer includes interpolymerized units derived from at least TFE and VDF in which the amount of VDF is at least 0.1 percent by weight, but less than 20 percent by weight. Desirably, the amount of VDF ranges from 3–15 percent by weight, more desirably from 10–15 percent by weight.

Examples of suitable fluoroelastomers include VDF-HFP copolymers, VDF-HFP-TFE terpolymers, TFE-propylene copolymers, and the like.

Polymeric substrates useful in practice of the invention may be provided in any form (e.g., as a film or as a molded or shaped article) so long as it is possible for an effective amount of actinic radiation to reach a surface of the polymeric substrate that is in contact with a solution of the inorganic photochemical electron donor. Desirably, the polymeric substrate may be in the form of a film. Such films may comprise one or more layers.

Inorganic Photochemical Electron Donor

Inorganic photochemical electron donors, as defined for purposes of the invention, include inorganic compounds, such as neutral compounds or the anionic portion of a salt that consists of an anion and a cation. In instances in which the inorganic photochemical electron donor is anionic, it may be paired with a cation that is either organic or inorganic provided that the cation does not substantially react with the anion in the absence of actinic radiation at 20° C. for a period of 5 minutes.

Inorganic photochemical electron donors used in practice of the invention are typically selected depending on the nature of polymeric substrate. Generally, the oxidation potential of the inorganic photochemical electron donor (expressed in volts), minus the reduction potential of the surface of the polymeric substrate (expressed in volts), minus the excitation energy of the inorganic photochemical electron donor (i.e., energy of the lowest lying triplet excited state of the inorganic photochemical electron donor, expressed in electron volts) is less than zero. Desirably, the oxidation potential of the inorganic photochemical electron donor minus the reduction potential of the surface of the polymeric substrate minus the excitation energy of the inorganic photochemical electron donor is less than –0.5 volts.

Oxidation potentials (and reduction potentials) of inorganic compounds can be determined by methods known to those skilled in the art, for example, by polarography. For example, methods for measuring oxidation potentials are described by A. J. Bard and L. R. Faulkner, "Electrochemical Methods, Fundamentals and Applications", John Wiley & Sons, Inc., New York (2001); and by D. T. Sawyer and J. L. Roberts, "Experimental Electrochemistry for Chemists", John Wiley & Sons, New York (1974), pp. 329–394.

"Excitation energy", as used herein, refers to the lowest energy triplet state of the light absorbing species (e.g., the inorganic photochemical electron donor, sensitizer, or substrate) expressed in electron volts. Methods for measurement of such energies are well known in the art and may be determined by phosphorescence measurements as described by, for example, R. S. Becker, Theory and Interpretation of Fluorescence and Phosphorescence, Wiley Interscience, New York, 1969, chapter 7. Spectrophotometers capable of making such measurements are readily available from companies, such as Jasco, Inc. (Easton, Md.) and Photon Technology International, Inc. (Lawrenceville, N.J.).

Oxygen perturbation techniques may also be used to measure triplet state energy levels as described in D. F. Evans, "Perturbation of Singlet-Triplet Transitions of Aromatic Molecules by Oxygen under Pressure", The Journal of the Chemical Society (London), 1957, pp. 1351–1357. The oxygen perturbation technique involves measuring the absorption spectrum of a compound while that compound is under an oxygen enhanced high-pressure environment, for example, 13.8 megapascals. Under these conditions, spin selection rules break down and exposure of the compound to actinic radiation generates the lowest excited triplet state directly from the ground state. The wavelength (i.e., $\lambda$), at which this transition occurs is used to calculate the energy of the lowest energy triplet state using the relationship of $E=hc/\lambda$, wherein E is the triplet state energy, h is Planck's constant, and c is the speed of light in a vacuum. The phosphorescence technique focuses on the fact that many compounds phosphoresce when UV generated excited triplets decay. By measuring the wavelength at which phosphorescence occurs, the triplet energy level may be calculated as described above.

Reduction potentials (usually expressed in volts) of polymers can be determined in several ways, especially electrochemically, as described, for example, by D. J. Barker, "The Electrochemical Reduction of Polytetrafluoroethylene," Electrochimica Acta, 1978, vol. 23, pp. 1107–1110; D. M. Brewis, "Reactions of polytetrafluoroethylene with Electrochemically Generated Intermediates," Die Angewandte Makromolekulare Chemie, 1975, vol. 43, pp. 191–194; S. Mazur and S. Reich, "Electrochemical Growth of Metal Interlayers in Polyimide Film," The Journal of Physical Chemistry, 1986, vol. 90, pp. 1365–1372. If the reduction potential of any particular polymer has not been measured, an approximation can be conveniently made, subject to verification, by using the reduction potential of a model compound that is structurally similar to the polymer. The reduction potential of a large number of organic compounds has been compiled by L. Meites, P. Zuman and (in part) E. Rupp, CRC Handbook Series in Organic Electrochemistry, vols. 1–6, CRC Press, Inc., Cleveland, Ohio and Boca Raton, Fla., published 1977–1983.

As is well known to those skilled in the art, oxidation and reduction potentials may vary somewhat with various experimental parameters. In such circumstances, the reduction potential should be measured under the conditions employed in practice of the invention (for example, such as by using the same solvent, concentration, temperature, pH, etc.).

Desirably, the reduction potential of the inorganic photochemical electron donor in the ground state should be lower than the reduction potential of the surface of the polymeric substrate, otherwise the inorganic photochemical electron donor may react spontaneously with the polymeric substrate.

Inorganic photochemical electron donors useful in practice of the invention may exist in aqueous solution as various species (e.g., as a conjugate acid or conjugate base). In such cases, the solution pH may be adjusted to maximize the concentration of the desired species.

In order that processes of the present invention may be carried out in a controlled reproducible fashion, inorganic photochemical electron donors useful in practice of the present invention do not significantly react with the surface of the specific polymeric substrate that they are intended to modify in the absence of actinic radiation at 20° C. during a period of 5 minutes. It is thus to be recognized that inorganic photochemical electron donors that are suitable for use with some polymeric substrates may be unsuitable for use with other polymeric substrates.

Anionic inorganic photochemical electron donors are typically combined with a non-interfering cation present in the form of a soluble salt. The term "non-interfering cation" refers to a cation that does not react substantially with the polymeric substrate surface at 20° C. during a period of 5 minutes, in the absence of actinic radiation. Exemplary non-interfering cations meeting this criterion include alkali metals, alkaline earth metals, organoammonium cations, organosulfonium cations, organophosphonium cations, organoarsonium cations, organoiodonium cations, ammonium, and the like.

While not a requirement of the invention, certain volatile inorganic photochemical electron donors, particularly some nitrogenous inorganic photochemical electron donors, may give off objectionable and/or hazardous fumes, when used in practice of the invention (e.g., during coating, handling, and heat-lamination processes), and are desirably not used. Volatile nitrogenous inorganic photochemical electron donors include ammonia, hydrazine, hydroxylamine, and their conjugate acid (i.e., protonated) salts such as ammonium salts and salts of protonated amines (i.e., primary, secondary, and tertiary ammonium salts) when present in aqueous solvents where equilibrium may exist between various acidic and basic forms. For example, for concentrations in excess of about 0.001 mole per liter in water, ammonium chloride has a vapor pressure exceeding 10 millipascals. It is desirable that the inorganic photochemical electron donor should be a non-volatile salt, as described hereinabove.

Exemplary soluble non-volatile salts may include alkali metal salts, amidinium salts, guanidinium salts, quaternary phosphonium salts, quaternary ammonium salts, and the like.

In some desired embodiments of the invention, inorganic photochemical electron donors may consist of a cationic portion that is useful as a cationic assistant and an anionic portion that is useful as an inorganic photochemical electron donor in the form of a salt (e.g., benzyltributylammonium thiocyanate).

Exemplary inorganic photochemical electron donors that may be used in practice of the invention include:

(a) sulfur-containing salts, such as thiocyanate salts, for example, potassium thiocyanate and tetraalkylammonium thiocyanates, etc.; sulfide salts, such as sodium sulfide, potassium hydrosulfide, sodium disulfide, sodium tetrasulfide, etc.; thiocarbonate salts, such as sodium thiocarbonate, potassium trithiocarbonate, etc.; thiooxalate salts, such as potassium dithiooxalate, sodium tetrathiooxalate, etc.; thiophosphate salts, such as cesium thiophosphate, potassium dithiophosphate, sodium monothiophosphate, etc.; thiosulfate salts, such as sodium thiosulfate, etc; dithionite salts, such as potassium dithionite, etc.; sulfite salts, such as sodium sulfite, etc.; and the like;

(b) selenium-containing salts, for example, selenocyanate salts, such as potassium selenocyanate; selenide salts, such as sodium selenide; and the like;

(c) inorganic nitrogen-containing compounds, for example azide salts, such as sodium azide, potassium azide, etc.; ammonia; hydrazine; and the like; and (d) iodine containing anions, such as iodide, triiodide, and the like.

Other inorganic species may be used in practice of the invention, provided they meet the selection criteria for inorganic donors given hereinabove.

Solvent

The inorganic photochemical electron donor is typically dissolved in a solvent, desirably a solvent that is not reactive with the inorganic photochemical electron donor in the absence of actinic radiation. Desirably, solvents for such photoreactive solutions should not significantly absorb actinic radiation at the same wavelength as the inorganic photochemical electron donor, or any sensitizer, if present. While it may be desirable in some instances to choose a solvent that is more difficult to reduce than the polymeric substrate in order to avoid possible side reactions, the invention may also be easily, and surprisingly, practiced in solvents (e.g., aqueous solvents) in which the solvent may be more easily reduced than the polymeric substrate. Such aqueous solvents, including water itself, have reduced environmental concerns as compared to typical organic solvents.

Water is an especially desirable solvent. Mixtures of at least one organic solvent and water (e.g., a mixture of two or more alcohols and water) are also desirable solvents. Essentially any known organic solvent may be employed, with the particular choice being determined by solubility and compatibility of the various components of photoreactive solution, the polymeric substrate, absorption spectrum, etc. Exemplary organic solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, etc.; ketones and ketoalcohols, such as acetone, methyl ethyl ketone, diacetone alcohol, etc.; esters, such as ethyl acetate and ethyl lactate, etc.; polyhydric alcohols, such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylopropane ethoxylate, etc.; lower alkyl ethers, such as ethylene glycol monomethyl or monoethyl ether, diethylene glycol methyl or ethyl ether, and triethylene glycol monomethyl or monoethyl ether, etc.; and the like.

Typically, the solvent should be chosen such that it does not dissolve, or significantly swell, the polymeric substrate. Typical concentrations of inorganic photochemical electron donor in the solvent are from about 0.001 to about 1 mole per liter. Desirably, concentrations of the inorganic photochemical electron donor are from about 0.01 to about 0.1 mole per liter.

Depending on the choice of solvent and polymeric substrate, differing surface modifications may be obtained. For example, in aqueous solvents, hydroxyl groups are typically abundant on the surface of the fluoropolymer. Without wishing to be bound by theory, it is believed that such hydroxyl groups may result from addition of water to a carbon-carbon double bound in the polymer backbone that is formed by reduction of the polymer.

Optional Cationic Assistant

The photoreactive solution may optionally include a cationic assistant. The cationic assistant is a compound (i.e., a salt) consisting of an organic cation and a non-interfering anion.

The term "non-interfering anion" refers to an anion (organic or inorganic) that does not react substantially at 20° C. during a period of 5 minutes, in the absence of actinic radiation, with the polymeric substrate surface. Some exemplary non-interfering anions meeting this criterion include halides, such as bromide, chloride, and fluoride; sulfate or sulfonate (e.g., para-toluenesulfonate); phosphate or phosphonate; complex metal halides, such as hexafluorophosphate, hexafluoroantimonate, tetrachlorostannate, and the like; perchlorate; nitrate; carbonate; sulfate; and bicarbonate.

Alternatively, and desirably, the non-interfering anion may be an anion that can function as an inorganic photochemical electron donor according to the processes of the invention to reduce a polymeric substrate. Suitable anionic inorganic photochemical electron donors are described hereinabove, such as iodide, triiodide, azide, thiocyanate, thiophosphate, etc.

Useful cationic assistants include organosulfonium salts, organoarsonium salts, organoantimonium salts, organoiodonium salts, organophosphonium salts, and organoammonium salts. Some salts of these types have been previously described in, for example, U.S. Pat. No. 4,233,421 (Worm), U.S. Pat. No. 4,912,171 (Grootaert et al.), U.S. Pat. No. 5,086,123 (Guenthner et al.) and U.S. Pat. No. 5,262,490 (Kolb et al.).

Exemplary organosulfonium salts that are useful as cationic assistants include triarylsulfonium salts, such as triphenylsulfonium chloride, trichlorophenylsufonium bromide, tritolylsulfonium chloride, diphenyl-(4-thiophenyl)phenylsulfonium hexafluorophosphate, trialkylsulfonium salts, such as tributylsulfonium chloride, ethyldibutylsulfonium bromide, and the like; and mixed alkyl aryl sulfonium salts, such as methyldiphenylsulfonium p-toluenesulfonate, ethyloctylphenylsulfonium chloride, butyldiphenylsulfonium hexafluorophosphate, and the like; and substituted derivatives thereof.

Exemplary organoarsonium salts that are useful as cationic assistants include tetraarylarsonium salts, such as tetraphenylarsonium chloride, tetratolylarsonium bromide, and the like; tetraalkylarsonium salts, such as tetramethylarsonium iodide, octyltrimethylarsonium bromide, tetraethylarsonium chloride, and the like; and mixed alkyl aryl arsonium salts, such as butyltriphenylarsonium iodide, and the like; and substituted derivatives thereof.

Exemplary organoantimonium salts that are useful as cationic assistants include tetraarylantimonium salts, such as tetraphenylantimonium chloride, tritolylantimonium chloride, and the like; tetraalkylantimonium salts, such as tetramethylantimonium iodide, octyltrimethylantimonium bromide, tetraethylantimonium chloride, and the like; and mixed alkyl aryl antimonium salts, such as butyldiphenylantimonium iodide, and the like; and substituted derivatives thereof.

Exemplary organoiodonium salts that are useful as cationic assistants include organoiodonium salts, such as diphenyliodonium chloride, diphenyliodonium hexafluoroantimonate, ditolyliodonium chloride, and the like; and substituted derivatives thereof.

Desirably, the cationic assistant may be an organophosphonium salt, desirably an organophosphonium salt having the formula:

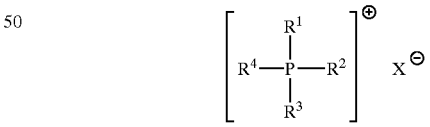

wherein $R^1$ represents a $C_1$–$C_{18}$ alkyl group, $C_6$–$C_{10}$ aryl group, $C_7$–$C_{18}$ aralkyl group, $C_7$–$C_{18}$ alkaryl group, $C_2$–$C_{18}$ alkenyl group, $C_4$–$C_{12}$ oxaalkyl group, or $C_4$–$C_8$ partially or completely fluorinated alkyl group;

$R^2$, $R^3$, and $R^4$ independently represent a $C_1$–$C_8$ alkyl group, a $C_6$–$C_{10}$ aryl group, a $C_7$–$C_9$ aralkyl group, or a $C_7$–$C_9$ alkaryl group, or a $C_2$–$C_8$ alkenyl group, wherein any of $R^2$, $R^3$, and $R^4$ may be joined together to form one or more rings, with the proviso that when $R_1$ has more than 8 carbon atoms that each of $R^2$, $R^3$, and $R^4$ may have no more than 4 carbon atoms; and $X^-$ is a non-interfering anion as defined hereinabove.

Of course, it is recognized that anions suitable for use with some polymeric substrates may be unsuitable for use with other polymeric substrates.

Exemplary organophosphonium salts include non-fluorinated organophosphonium salts, such as tetraphenylphosphonium chloride, tetraphenylphosphonium bromide, tetraoctylphosphonium chloride, tetra-n-butylphosphonium chloride, tetraethylphosphonium chloride, tetramethylphosphonium chloride, tetramethylphosphonium bromide, benzyltriphenylphosphonium chloride, benzyltriphenylphosphonium bromide, benzyltriphenylphosphonium stearate, benzyltriphenylphosphonium benzoate, triphenylisobutylphosphonium bromide, n-butyltrioctylphosphonium chloride, benzyltrioctylphosphonium chloride, benzyltrioctylphosphonium acetate, 2,4-dichlorobenzyltriphenylphosphonium chloride, (methoxyethyl)trioctylphosphonium chloride, triphenyl(ethoxycarbonylmethyl)phosphonium chloride, allyltriphenylphosphonium chloride, and the like; and fluorinated organo phosphonium salts, such as trimethyl(1,1-dihydroperfluorobutyl)phosphonium chloride, benzyl-[3-(1,1-dihydroperfluoropropoxy)propyl]diisobutylphosphonium chloride), benzylbis[3-(1,1-dihydroperfluoropropoxy)propyl]isobutylphosphonium chloride), $C_6F_{13}CH_2CH_2P(CH_2CH_2CH_2CH_3)_3{}^+I^-$, and the like;

Additionally, the cationic assistant may desirably be an organoammonium salt, desirably an organoammonium salt having the formula:

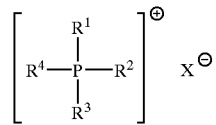

wherein $R^1$, $R^2$, $R^3$, $R^4$, and $X^-$ are as previously defined.

Exemplary ammonium salts include non-fluorinated organoammonium salts, such as tetraphenylammonium chloride, tetraphenylammonium bromide, tetraoctylammonium chloride, tetra-n-butylammonium chloride, tetraethylammonium chloride, tetramethylammonium chloride, tetramethylammonium bromide, benzyltributylammonium chloride, triphenylbenzylammonium fluoride, triphenylbenzylammonium bromide, triphenylbenzylammonium acetate, triphenylbenzylammonium benzoate, triphenylisobutylammonium bromide, trioctyl-n-butylammonium chloride, trioctylbenzylammonium chloride, trioctylbenzylammonium acetate, triphenyl-2,4-dichlorobenzylammonium chloride, trioctylmethoxyethoxyethylammonium chloride, triphenylethoxycarbonylmethylammonium chloride, triphenylallylammonium chloride, 1-butylpyridinium chloride, and the like; and fluorinated organoammonium salts, such as trimethyl(1,1-dihydroperfluorobutyl)ammonium chloride, $C_7F_{15}CONHCH_2CH_2NMe_3{}^+I^-$, $C_4F_9OCF_2CF_2OCF_2CH_2CONHCH_2CH_2NMe_3{}^+I^-$, and the like.

In one desired embodiment, a fluorinated cationic assistant, optionally having one or more light-absorbing aromatic groups (e.g., phenyl) is employed. The cationic assistant may be a surfactant, but there is no criticality to that feature.

The presence of a fluorinated anionic surfactant (e.g., perfluoroalkanoate salts, such as perfluorooctanoate salts) in the photoreactive solution, especially when the photoreactive solution is aqueous, may reduce the observed rate of surface modification, and bonding capability of the surface modified polymeric substrate. For this reason, it is desirable that the photoreactive solution is substantially free of (for example, less than an amount sufficient to achieve about a monolayer coverage of fluorinated anionic surfactant on the polymeric substrate surface to be modified) and, more desirably, entirely free of a fluorinated anionic surfactant.

Without wishing to be bound by theory, it is believed that the fluorinated anionic surfactant wets (i.e., is adsorbed on) the surface of the polymeric substrate and thereby inhibits surface modification. Cationic assistants, desirably fluorinated cationic assistants, compete with and displace the fluorinated anionic surfactant from the surface of the polymeric substrate with a resultant increase in the rate of surface modification. Thus, if the photoreactive solution comprises a fluorinated anionic surfactant, then desirably the photoreactive solution further comprises at least one cationic assistant, more desirably a fluorinated cationic assistant.

Desirably, the cationic assistant is a fluorinated organophosphonium salt or a fluorinated organoammonium salt or a mixture thereof. In particular, in instances in which the substrate surface to be modified is a fluorinated polymer, a fluorinated cationic assistant may be desirably used in combination with a non-fluorinated cationic assistant.

Desirably, the cationic assistant may also function as a sensitizer.

Sensitizer

In order for surface modification to occur, actinic radiation must either be absorbed by the inorganic photochemical electron donor, by the polymer, or by another material that absorbs the actinic radiation and is capable of transferring that energy in an amount of greater than or equal to the excitation energy of the inorganic photochemical electron donor. In the absence of a sensitizer, the particular wavelength of actinic radiation chosen must correspond to one or more wavelengths that are absorbed by the inorganic photochemical electron donor, which may not always convenient. To allow use of convenient light sources, and/or increase the absorption of actinic radiation, a sensitizer may optionally be employed.

A sensitizer is a compound, or in the case of a salt an ionic portion of a compound (e.g., an anion or cation) that by itself is not an effective modifier of the polymer surface properties with or without the presence of actinic radiation, but that absorbs light and subsequently mediates modification of the polymeric substrate surface by the inorganic photochemical electron donor. Typically, sensitizers that are useful in practice of the invention are not consumed during processes of the invention. Of course, in the instance in which the sensitizer comprises a cationic moiety in combination with an anionic inorganic photochemical electron donor, the cationic moiety (i.e., sensitizer) will remain unconsumed, but the anionic electron donor may be consumed.

Typically, if a sensitizer is employed, it is chosen so that it will not significantly react with the polymeric substrate surface either directly, or by means of actinic radiation, in the absence of an inorganic photochemical electron donor. Typical concentrations for sensitizers are from about 0.001 to about 0.1 moles/liter.

Desirably, in some instances, a sensitizer may also serve as a cationic assistant.

In addition to light absorbing cationic assistants as mentioned herein, exemplary sensitizers include aromatic hydrocarbons, such as benzene, naphthalene, toluene, styrene, and the like; aromatic ethers, such as diphenyl ether, anisole, and the like; aryl ketones, such as benzophenone, benzil dimethyl ketal, acetophenone, xanthone, and the like; and aromatic thioethers, such as diphenyl sulfide, methyl phenyl sulfide, and the like, and water-soluble modifications thereof.

Other Additives

Additives such as, for example, crown ethers and cryptands that may improve dissociation of ionic salts may be beneficial in some instances (e.g., low polarity solvents). Exemplary crown ethers include 15-crown-5,12-crown-4, 18-crown-6,21-crown-7, dibenzo-18-crown-6, dicyclohexyl-18-crown-6, benzo-15-crown-5 which may be readily obtained from commercial sources, such as Aldrich Chemical Co. (Milwaukee, Wis.).

Nucleophiles and latent nucleophiles (e.g., materials that generate a nucleophile upon irradiation or heating) may be added to the photoreactive solution. In some embodiments of the invention, such as those embodiments that modify the surface of a fluoropolymer film, nucleophilic materials may become grafted to the surface of the fluoropolymer. Nucleophiles, that is, materials that have a preferential attraction to regions of low electron density, are well known and may include water, hydroxide, alcohols, alkoxides, cyanide, cyanate, chloride, etc. The term "nucleophile", as used herein, does not include any material that may be considered as an inorganic photochemical electron donor.

Additional additives may be present in the photoreactive solution. Desirably, any such materials do not strongly absorb actinic radiation or have a reduction potential greater than (i.e., less negative) than the polymeric substrate, as either of these conditions may be detrimental to processes of the present invention.

Second Substrate

The second substrate may comprise a polymer film, metal, glass, or other. Desirably, the second substrate is a polymer film, such as a fluoropolymer or a non-fluorinated polymer, which may be the same as, or different from, the polymeric substrate. Desirably, the second substrate should have polar groups on its surface, available to be bonded to, so as to aid in forming a strong adhesive bond. Polar groups may be introduced by known techniques, including for example, corona treatment, etc.

Exemplary non-fluorinated polymers useful in film form include polyamides, polyolefins, polyethers, polyurethanes, polyesters, polyimides, polystyrene, polycarbonates, polyketones, polyureas, acrylics, and mixtures thereof, and the like.

In some embodiments, a non-fluorinated polymer may be a non-fluorinated elastomer, such as acrylonitrile butadiene rubber (NBR), butadiene rubber, chlorinated and chlorosulfonated polyethylene, chloroprene, ethylene-propylene monomer (EPM) rubber, ethylene-propylene-diene monomer (EPDM) rubber, epichlorohydrin (ECO) rubber, polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers include ELVAX, available from E.I du Pont de Nemours and Co. (Wilmington, Del.).

Many polyamides that are useful as non-fluorinated polymers are generally commercially available. For example, polyamides, such as any of the well known nylons are available from a number of sources. Particularly desirable polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat and moisture resistance properties than nylon-11 and nylon-12, whereas nylon-11 and nylon-12 offer better chemical resistance properties. In addition, other nylon materials, such as nylon-6,12, nylon-6,9, nylon-4, nylon-4,2, nylon-4,6, nylon-7, and nylon-8 may be used, as well as ring-containing polyamides, such as nylon-6,T and nylon-6,1. Suitable nylons include VESTAMID L2140, a nylon-12, available from Creanova, Inc. (Somerset, N.J.). Polyether-containing polyamides having the trade designation PEBAX, available from Atochem North America (Philadelphia, Pa.) may also be used.

Useful polyurethanes include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include 4,4'-dicyclohexylmethane diisocyanate, isophorone diisocyanate, 1,6-hexamethylene diisocyanate, 1,4-cyclohexylene diisocyanate, and 4,4'-diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders, such as butanediol or hexanediol may also be used in the reaction. Useful commercially available urethane polymers include MORTHANE L424.167 (MI=9.7), PN-04 or 3429, from Morton International (Seabrook, N.H.), and X-4107, from B. F. Goodrich Co. (Cleveland, Ohio).

Useful polyolefins include homopolymers of ethylene, propylene, and the like, as well as copolymers of these monomers with, for example, acrylic monomers and other ethylenically unsaturated monomers, such as vinyl acetate and higher alpha-olefins. Such polymers and copolymers may be prepared by conventional free radical polymerization or catalysis of such ethylenically unsaturated monomers. The degree of crystallinity of the polymer may vary. The polymer may, for example, be a semi-crystalline high density polyethylene or may be an elastomeric copolymer of ethylene and propylene. Carboxylic acid, anhydride, or imide functionalities may be incorporated into the polymer by polymerizing or copolymerizing functional monomers, such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available, for example, under the trade designations ENGAGE (Dow-DuPont Elastomers, Wilmington, Del.) or EXACT (ExxonMobil, Linden, N.J.). Suitable anhydride modified polyethylene polymers are commercially available from E.I. du Pont de Nemours and Co. (Wilmington, Del.), under the trade designation BYNEL co-extrudable adhesive resins.

Useful acrylics include polymers of acrylic acid, methyl acrylate, ethyl acrylate, acrylamide, methacrylic acid, methyl methacrylate, ethyl methacrylate, and the like, and mixtures thereof.

Useful polycarbonates include aliphatic polycarbonates, such as polyester carbonates, polyether carbonates, and bisphenol A-derived polycarbonates, and the like.

Useful polyimides include polyimide polymers made from the anhydride of pyromellitic acid and 4,4'-diaminodiphenyl ether, available from E.I. du Pont de Nemours and Co. under the trade designation KAPTON. Variations include KAPTON H, KAPTON E, and KAPTON V, among others.

Additional examples of useful non-fluorinated polymers, as noted above, include polyesters, polycarbonates, polyketones, and polyureas. Exemplary commercially available polymers include polyesters having the trade designation SELAR (E.I. du Pont de Nemours and Co.), polycarbonates having the trade designation LEXAN (General Electric Co., Pittsfield, Mass.), polyketones having the trade designation KADEL (Amoco Corp., Chicago, Ill.), and polyureas having the trade designation SPECTRIM (Dow Chemical Co., Midland, Mich.).

Exemplary commercially available elastomers include those having the trade designations NIPOL 1052 NBR, HYDRIN C2000 epichlorohydrin-ethylene oxide rubber, and ZETPOL hydrogenated NBR (Zeon Chemical, Louisville, Ky.); HYPALON 48 chlorosulfonated polyethylene rubber and VAMAC ethylene-acrylate elastomer (E.I. du Pont de Nemours and Co., Wilmington, Del.); NORDEL EPDM (R. T. Vanderbilt Co., Inc., Norwalk, Conn.); KRYNAC NBR, PERBUNAN NBR/PVC blend and THERBAN hydrogenated NBR (Bayer Corp., Pittsburgh, Pa.); SANTOPRENE thermoplastic elastomers (Advanced Elastomer Systems, Akron, Ohio); and KELTAN EPDM (DSM Elastomers Americas, Addis, La.).

The polymeric substrate and second substrate may be the same or different. Thus, fluoropolymers useful for the polymeric substrate may also be used for the second substrate, desirably in film form.

The polymeric substrate and/or second substrate may have one or more surface polar functionality present thereon to enhance bonding, such as, for example, an amino, carboxyl and hydroxyl functionality.

Actinic Radiation

Actinic radiation is electromagnetic radiation having a wavelength capable of modifying the polymeric substrate in the presence of the photoreactive solution. Desirably, the actinic radiation has sufficient intensity and wavelength such that such modification occurs within less than about 10 minutes, more desirably within less than about 3 minutes. The actinic radiation may have a wavelength of from about 200 nanometers to about 400 nanometers, desirably from about 240 nanometers to about 300 nanometers, more desirably from about 250 nanometers to about 260 nanometers.

Actinic radiation also includes longer wavelength photons supplied at sufficient intensity (e.g., by using a pulsed laser) to be absorbed simultaneously. For example, simultaneous absorption of two 700 nanometer photons would have the same effect as one 350 nanometer photon, and is therefore included by the term actinic radiation.

Typical sources of actinic radiation often have multiple or continuous wavelength outputs, although lasers may be used. Such sources are suitable so long as at least some of their output is at one or more wavelengths that are absorbed by the inorganic photochemical electron donor and/or the optional sensitizer. To ensure efficient use of the actinic radiation, the wavelength of the actinic radiation used may be chosen such that the molar absorptivity of the inorganic photochemical electron donor and/or optional sensitizer at such wavelengths desirably is greater than 100 liter/(mole-centimeter), more desirably greater than 1,000 liter/(mole-centimeter), and still more desirably greater than 10,000 liter/(mole-centimeter). Absorption spectra of many inorganic compounds, from which molar absorptivities may be calculated, are commonly available, or may be measured by methods well known to those skilled in the art.

Suitable sources of actinic radiation include mercury, for example, low-pressure mercury and medium-pressure mercury arc lamps; xenon arc lamps, carbon arc lamps; tungsten filament lamps; lasers, for example, excimer lasers; microwave-driven lamps, such as those sold by Fusion UV Systems of Rockville, Md. (including H-type and D-type bulbs); flash lamps, for example, xenon flash lamps; sunlight, and so forth. UVC ultraviolet radiation (i.e., ultraviolet radiation having a wavelength of less than 290 nanometers) is especially desirable.

Low-pressure (e.g., germicidal) mercury lamps are highly efficient, convenient sources of actinic radiation, and are especially desirable sources of actinic radiation for practicing the invention.

Surface Modification and Bonding Conditions

The inorganic photochemical electron donor and the surface of the polymeric substrate may be conveniently brought into contact by dissolving the inorganic photochemical electron donor in an inert solvent (i.e., a solvent that is not reactive, as defined hereinabove, with the inorganic photochemical electron donor) and contacting the resultant photoreactive solution with the surface of the polymeric substrate.

The photoreactive solution layer (or coated layer) between the light source and the surface of the polymeric substrate is desirably relatively thin, so that as much of the actinic radiation as possible reaches the photoreactive solution/polymeric substrate interface. In order to improve wetting of the polymeric substrate surface and/or the second substrate surface, the photoreactive solution may further comprise one or more of a thixotrope; a thickener; a gelation agent; latex particles; fibers; inorganic particles; an emulsifiable phase; and a transparent or translucent, woven or nonwoven, material, and the like. Thus, the photoreactive solution may, for example, be in the form of a translucent or transparent gel, thixotropic gel, viscous emulsion, latex, slurry, or other.

The duration of exposure to actinic radiation may be from less than about 1 second to 10 minutes or more, depending upon the absorption parameters and specific processing conditions used. In embodiments of the invention, wherein the polymeric substrate is transparent or translucent, actinic radiation may be advantageously directed to the photoreactive solution/polymeric substrate interface by passing through the polymeric substrate without passing through the photoreactive solution.

A polymeric substrate having first and second major surfaces (for example, an unsupported film or tube) may be contacted, at the first major surface, with a photoreactive solution to form an interface such that the second major surface remains substantially uncoated by the photoreactive solution. Subsequent exposure of the interface to actinic radiation results in modification of the first major surface. Such a process is advantageous over immersing the polymeric substrate in the photoreactive solution as it allows actinic radiation to be applied through the polymeric substrate (e.g., in cases in which it is transparent or translucent to the actinic radiation). Further, in many cases involving fluoropolymers it is desirable to modify a single major surface in order to enhance bonding (e.g., to a polymer film) while preserving inherent fluoropolymer surface properties of a second major surface of the polymeric substrate.

In cases in which the actinic radiation must pass through the photoreactive solution prior to encountering the interface, it is especially desirable to achieve a uniform thin coating of the photoreactive solution. Such thin coatings, which may be achieved by standard coating techniques (e.g., knife coating, roll coating, etc.) are difficult or impossible to obtain by an immersion technique. Uneven depth of the photoreactive solution necessarily results in varying degrees of surface modification of the polymeric substrate, which will result in a chemically non-uniform surface.

For such processes in which the actinic radiation is generated by low pressure mercury lamps at UVC (i.e., wavelength <260 nanometers) intensity levels of 10 to 40 milliwatts per square centimeter, exposure times of less than 20 seconds are often achieved.

The process may be run in any apparatus suitable for containing the polymeric substrate and the photoreactive solution containing the inorganic photochemical electron donor. If the polymeric substrate is easily coated with the photoreactive solution, the coated polymeric substrate may be directly exposed to the actinic radiation.

Elevated temperature and pressure are normally not required, and the process is typically conveniently carried out at ambient conditions.

By masking or blocking actinic radiation from a portion of the polymeric substrate polymer surface (or by using a focused beam, for example, a laser beam), it is possible to create patterns on the polymeric substrate surface consisting of modified and unmodified surface. Of course, the unmodified surface will exist where the surface was not exposed to actinic radiation.

More than one surface of the polymeric substrate (e.g., opposite sides of a polymer film) may be modified according to the invention.

Varying degrees of surface modification may be obtained by partially filtering the actinic radiation, such that different intensities of actinic radiation are obtained over different parts of the polymeric substrate surface. The same effect can be obtained by varying the exposure time to actinic radiation. The degree of surface modification may be determined by various well known surface analysis techniques including, but not limited to, Attenuated Total internal Reflectance infrared spectroscopy (ATR IR) and Electron Scattering for Chemical Analysis (ESCA), as well as contact angle measurements.

The surface of the polymeric substrate, once modified according to the present invention, may be bonded to a second substrate that may be organic or inorganic. Such bonding may be accomplished by contacting the second substrate (e.g., a polymer film) with a modified surface of the polymeric substrate and applying heat (e.g., elevated temperature) and/or pressure, desirably using both heat and pressure. Suitable heat sources include, but are not limited to, ovens, heated rollers, heated presses, infrared radiation sources, flame, and the like. Suitable pressure sources are well known and include presses, nip rollers, and the like. The necessary amounts of heat and pressure will depend on the specific materials to be bonded, and may be easily determined.

Figure 2:
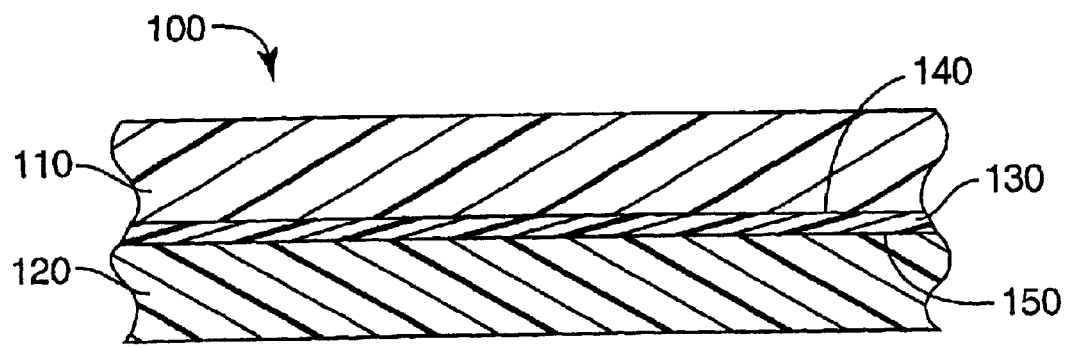
FIG. 2 is a cross-sectional view of an assembly used in practice of one embodiment of the invention.

In another embodiment of the invention, the polymeric substrate and the second substrate may be two polymer films, that may be brought together such that they are separated by a thin film of photoreactive solution as shown in FIG. 2. FIG. 2 is a cross-sectional view of an assembly 100 in which a polymeric substrate 110 and a polymer film 120 are both in intimate contact with a thin film of photoreactive solution 130. The photoreactive solution forms interface 140 with the polymeric substrate and interface 150 with the polymer film. Photoreactive solution 130 is exposed to actinic radiation to form a composite article. The composite article may optionally be heated under pressure subsequent to exposure to actinic radiation.

In this method, in order to provide efficient surface bonding, the thin film of photoreactive solution desirably has a thickness of less than about 10 micrometers, more desirably less than 1 micrometer.

In certain situations, more than two second substrates (e.g., two polymer films) may contact more than one surface of the polymeric substrate (e.g., a three layer film sandwich construction). In still other situations, two polymeric substrates may contact two surfaces of a fluoropolymer film.

In some instances (e.g., sequential polymeric substrate modification and bonding processes), it may be desirable to rinse the surface of the modified polymeric substrate prior to bonding. Rinsing removes any components from the photoreactive solution that are not directly bonded to the polymeric substrate and which may cause a decrease in observed adhesion.

Polymeric substrates having modified surfaces according to the invention, especially modified fluoropolymer surfaces, may also have utility for microfluidic devices (e.g., lab on a chip), in electronics, for immobilizing biologically active molecules, for forming conductive surfaces (e.g., including metallized surfaces), and for forming antistatic surfaces.

The invention will now be described further by way of the following examples.

EXAMPLES

The following abbreviations are used in the Examples and Tables that follow:

"BOPP" refers to a film (23 micrometers thickness) of biaxially oriented polyethylene terephthalate having the trade designation "MYLAR TYPE A", commercially available from DuPont Teijin Films U.S. Limited Partnership (Wilmington, Del.);

"Bu" means n-butyl;

"cm" means centimeter;

"conc." means concentrated;

"Et" means ethyl;

"EVA" refers to an acid modified ethylene-vinyl acetate copolymer having the trade designation "BYNEL 3101", commercially available from E.I. du Pont de Nemours and Co. (Wilmington Del.); in the examples that follow, pellets of BYNEL 3101 were pressed to form films having a thickness of from 1.3 to 1.8 millimeters;

"FEP" refers to a film (0.28 millimeters thickness) of a copolymer of tetrafluorethylene and hexafluoropropylene, 85/15 by weight having the trade designation "FEP X6307", commercially available from Dyneon, LLC (Oakdale, Minn.);

"g" means grams;

"KHN" refers to a film (12 micrometers film thickness) of polyimide having the trade designation "KAPTON HN", commercially available from E.I. du Pont de Nemours and Co.;

"Me" means methyl;

"mL" means milliliters;

"N/cm" means Newtons per centimeter;

"NM" means not measured;

"NYL-12" refers to a film of nylon-12 having a Vicat softening point of 140° C. and having the trade designation "VESTAMID L2140", commercially available from Creanova, Inc. (Somerset, N.J.); in the examples that follow, pellets of VESTAMID L2140 were pressed to form films having a thickness of from 1.3 to 1.8 millimeters;

"parts" refers to parts by weight;

"Pe" means n-pentyl;

"PFA" refers to a film (0.28 millimeters thickness) of a copolymer of tetrafluoroethylene and perfluoropropyl vinyl ether; it was prepared by coagulating a polymer dispersion having the trade designation "PFA-65 ION", commercially available from Dyneon, LLC (Oakdale, Minn.), drying the coagulant, pulverizing the dried coagulant to form a powder, and melt extruding the powder to form a polymer film;

"Ph" means phenyl;

"PTFE" refers to a film (0.38 millimeters thickness) of polytetrafluoroethylene having the trade designation "TEFLON PTFE", commercially available from E.I. du Pont de Nemours and Co.;

"THVG" refers to a film (0.48 millimeters thickness) of a terpolymer of TFE/HFP/VDF having the trade designation "THV 500G", commercially available from Dyneon, LLC (Oakdale, Minn.);

"tore" means that the test sample failed cohesively in one of the polymer films;

"wt. %" means weight percent;

"--" means not detected; and

"*" means that a cationic assistant is present in the inorganic photochemical electron donor.

Unless otherwise noted, materials used in the examples that follow are readily available from general commercial chemical suppliers, such as, for example, Aldrich Chemical Co. (Milwaukee, Wis.).

Preparation of Rf-Onium 1 and Rf-Onium 2

Rf-onium 1 (i.e., benzyl-[3-(1,1-dihydroperfluoropropoxy)propyl]diisobutylphosphonium chloride) and Rf-onium 2 (i.e., benzylbis[3-(1,1-dihydroperfluoropropoxy)propyl]isobutylphosphonium chloride) were prepared based on the procedure described in U.S. Pat. No. 5,734,085 (Coggio et al.), Examples 2 and 3, respectively.

Preparation of Rf-Onium 3

Rf-onium 3 (i.e., $C_6F_{13}CH_2CH_2P(CH_2CH_2CH_2CH_3)_3^+I^-$) was prepared as follows: Into a 25 mL flask was placed 8.0 g 1H,1H,2H,2H-perfluoro-1-iodohexane, obtained from Lancaster Synthesis, Inc. (Windham, N.H.) and 4.4 g tributylphosphine. The reaction mixture was stirred and heated at 65° C. under nitrogen gas. The solution became viscous after a while and the reaction mixture was allowed to stir overnight yielding Rf-onium 3, which was used without further purification.

Preparation of Rf-Onium 4

Rf-onium-4 (i.e., $C_7F_{15}CONHCH_2CH_2NMe_3^+I^-$) was prepared as follows: Into a flask was placed 27.7 parts $C_7F_{15}CO_2Me$ and 6.7 parts 3-(dimethylamino)propylamine. The reaction started during the addition of the amine. After addition, the solution was stirred at room temperature overnight under nitrogen. Methyl iodide (11 parts) was then slowly added to the stirred mixture, resulting in formation of a white solid. After addition of methyl iodide was completed, the reaction mixture was allowed to stir for another 3 hours to yield Rf-onium 4, which was used without further purification.

Preparation of Rf-Onium 5

Rf-onium 5 (i.e., $C_4F_9OCF_2CF_2OCF_2CONHCH_2CH_2NMe_3^+I^-$) was prepared as follows: Into a flask was placed 30 parts $C_4F_9OCF_2CF_2OCF_2CO_2Me$ and 6.7 parts 3-(dimethylamino)propylamine. The reaction started during the addition of the amine. After addition, the solution was stirred at room temperature overnight under nitrogen. Methyl iodide (11 parts) was then slowly added to the stirred mixture, resulting in formation of a white solid. After addition of methyl iodide was completed, the reaction mixture was allowed to stir for another 3 hours to yield Rf-onium 5, which was used without further purification.

General Method for Forming a Polymer Film:

A polymer film is prepared by placing polymer granules between two PTFE films and softening them for 2–3 minutes at 200° C. Subsequently, the softened materials are pressed for about 5 to 10 seconds between two heated platens of a Wabash Hydraulic press (Wabash Metal Products Company, Inc., Hydraulic Division, Wabash, Ind.) and immediately transferred to a cold Wabash hydraulic press at 13–15° C. and 140–280 millipascals. After cooling to room temperature in the cold press, round-shaped films of polymer having a thickness of approximately 1.5 millimeters are obtained. Rectangular samples having dimensions of 1.3 cm by 5.1 cm are cut for use in bonding and contact angle measurements.

General Procedure A:

A glass microscope slide, not transparent to 254 nanometer radiation, and approximately 2.5 cm by 5 cm in dimensions, is flood coated with a solution to be evaluated. A piece of a first polymer film is manually affixed to the coated surface of the slide and temporarily fixed in place using spring clips. The laminated sample, thus produced, is then placed vertically in the center of a Rayonet chamber photoreactor, model RPR-100 equipped with sixteen germicidal lamps (an ultraviolet radiation source with maximum intensity at a wavelength of 254 nanometers), obtained from The Southern New England Ultraviolet, Inc. (New Haven, Conn.) for the indicated amount of time. The irradiated sample is taken out of the photoreactor, and separated from the slide. The irradiated polymer film is rinsed and measured for advancing contact angle, and/or the irradiated film was heat-laminated to a second polymer film (as indicated) for 2 minutes at 200° C. and 30 kilopascals pressure. In the Tables below, heat-laminated (i.e., bonded) polymer films prepared by this procedure are reported as irradiated polymer film/ second polymer film. For example, PFA/NYL-12 means that the treated polymer film is PFA and the second polymer film is NYL-12.

General Procedure B:

A glass microscope slide, not transparent to 254 nanometer radiation, and approximately 2.5 cm by 5 cm in dimensions, is flood coated with a solution to be evaluated. A piece of a first polymer film is manually affixed to the coated surface of the slide and temporarily fixed in place using spring clips. The laminated sample, thus produced, is then placed at a distance of 2 inches (5 centimeters) under a flat bank of six 15 watt G15T8 germicidal bulbs, obtained from General Electric Co. (Schenectady, N.Y.) spaced on 2 inch (5 centimeter) centers (an ultraviolet radiation source with maximum intensity at a wavelength of 254 nanometers), for the indicated amount of time. The irradiated sample is removed from the lamps, and separated from the slide. The irradiated polymer film is rinsed and measured for advancing contact angle, and/or the irradiated film was heat-laminated to a second polymer film (as indicated) for 2 minutes at 200° C. and 30 kilopascals pressure. In the Tables below, heat-laminated (i.e., bonded) polymer films prepared by this procedure are reported as irradiated polymer film/ second polymer film. For example, PFA/NYL-12 means that the treated polymer film is PFA and the second polymer film is NYL-12.

Test Methods

Advancing contact angles were measured using a VCA 2500XE Video Contact Angle measuring system, AST Products, Inc. (Billerica, Mass.) after washing the surface to be tested with distilled water and methanol, and drying it thoroughly.

Adhesion was measured according to ASTM D-1876 (T-peel test). A SinTech 20 tensile testing apparatus available from MTS Systems Corp. (Eden Prairie, Minn.), and set at a crosshead speed of 10.2 cm per minute was used as the test device. The peel strength was calculated as the average load measured during the peel test.

Examples 1–11 and Comparative Examples A–B

Examples 1–11 and Comparative Examples A and B were generated according to General Procedure A above, and tested as indicated in Table 1.

TABLE 1

| Example | Inorganic Photochemical Electron Donor | Solvent | UV Exposure (minutes) | Advancing Contact Angle on FEP Film (degrees) | Adhesion lb/in (N/cm) | Polymer Films Bonded |
|---|---|---|---|---|---|---|
| Comparative Example A | — | — | 0 | 110 | 0 (0) | FEP/NYL-12 |
| Comparative Example B | — | — | 10 | 110 | 0 (0) | FEP/NYL-12 |
| 1 | Na$_2$S.9H$_2$O (0.2 g) | H$_2$O (1.6 g) | 10 | 78 | 3.5 (6.2) | FEP/NYL-12 |
| 2 | Na$_2$S$_2$O$_3$ (0.2 g) | H$_2$O (1.6 g) | 10 | 72 | 6.0 (11) | FEP/NYL-12 |
| 3 | Na$_2$S$_2$ (0.2 g) | H$_2$O (1.6 g) | 10 | 62 | 4.5 (7.8) | FEP/NYL-12 |
| 4 | KSCN (0.2 g) | MeCN (1.6 g) | 10 | 102 | 2.6 (4.6) | FEP/NYL-12 |
| 5 | Bu$_4$NSCN (0.2 g,*) | MeCN (1.6 g) | 10 | 102 | 0.5 (0.9) | FEP/NYL-12 |
| 6 | Na$_2$CS$_3$ (0.2 g) | H$_2$O (1.6 g) | 10 | 81 | 3.0 (5.3) | FEP/NYL-12 |
| 7 | Na$_3$PO$_3$S (0.2 g) | H$_2$O (1.6 g) | 10 | 62 | 2.5 (4.4) | FEP/NYL-12 |
| 8 | Na$_2$S.9H$_2$O (0.1 g), Na$_2$S$_2$O$_3$ (0.1 g) | H$_2$O (1.6 g) | 10 | 66 | 3.2 (5.7) | FEP/NYL-12 |
| 9 | Na$_2$S.9H$_2$O (0.1 g) | MeOH (2.0 g) | 5 | 95 | 0.94 (1.7) | FEP/NYL-12 |
| 10 | Na$_2$S.9H$_2$O (0.1 g) | MeOH (1.0 g), H$_2$O (1.0 g) | 5 | NM | 3.0 (5.3) | FEP/NYL-12 |
| 11 | Na$_2$S.9H$_2$O (0.1 g) | MeOH (1.0 g), H$_2$O (1.0 g) | 5 | NM | 0.5 (0.9) | FEP/EVA |

Examples 12–36 and Comparative Example C

Examples 12–36 and Comparative Example C were generated according to General Procedure A above, and tested as indicated in Table 2. The relative abundance of various atoms at the polymer surface was determined by ESCA using a 15 degree incidence angle. Table 2 shows that the surface of an FEP polymeric film was chemically modified by irradiation in the presence of an inorganic photochemical electron donor. Table 2 also shows that cationic assistants may be advantageously used to improve the effectiveness of irradiation.

TABLE 2

| Example | Inorganic Photochemical Electron Donor | Solvent | Cationic Assistant | UV Exposure (minutes) | Advancing Contact Angle on FEP Film (degrees) | Surface Composition (atomic percent) | | | | | |
|---|---|---|---|---|---|---|---|---|---|---|---|
| | | | | | | F | C | O | S | N | P |
| Comparative Example C | — | — | — | 0 | 110 | 67 | 33 | — | — | — | — |
| 12 | Na$_2$S.9H$_2$O (0.2 g) | MeOH (2.0 g) | Bu$_4$PBr (0.1 g) | 4 | 88 | NM | NM | NM | NM | NM | NM |
| 13 | Na$_2$S.9H$_2$O (0.2 g) | H$_2$O (1.6 g) | Bu$_4$PBr (0.1 g) | 1 | 75 | 43 | 49 | 3.9 | 1.8 | <1.0 | 0 |
| 14 | Na$_2$S.9H$_2$O (0.2 g) | H$_2$O (1.6 g) | Bu$_4$PBr (0.1 g) | 4 | 66 | 9.2 | 74 | 13 | 2.9 | 0 | 0 |
| 15 | Na$_2$S.9H$_2$O (0.2 g), NH$_4$OH (conc., 0.1 g) | H$_2$O (1.6 g) | Bu$_4$PBr (0.1 g) | 1 | 70 | 41 | 49 | 5.0 | 2.6 | 1.3 | 1.4 |
| 16 | Na$_2$S.9H$_2$O (0.2 g), NH$_4$OH (conc., 0.1 g) | H$_2$O (1.6 g) | Bu$_4$PBr (0.1 g) | 4 | 62 | 23 | 58 | 8.7 | 5.2 | 1.5 | 3.0 |
| 17 | Na$_2$S.9H$_2$O (0.2 g) | H$_2$O (1.6 g) | (n-hexyl)$_4$NCl (0.1 g) | 1 | 73 | 38–39 | 51 | 5.7 | 1.9–2.4 | 2.4–3.0 | 0 |
| 18 | Na$_2$S.9H$_2$O (0.2 g) | H$_2$O (1.6 g) | (n-hexyl)$_4$NCl (0.1 g) | 5 | 67 | 11–18 | 67 | 8–9 | 4.7–8.9 | 2.4–2.9 | 0 |
| 19 | Na$_2$S.9H$_2$O (0.2 g) | H$_2$O (1.6 g) | Pe$_4$NCl (0.1 g) | 1 | 69 | 37 | 50–51 | 4.6–5.9 | 5.2 | 2.0 | 0 |
| 20 | Na$_2$S.9H$_2$O (0.2 g) | H$_2$O (1.6 g) | Pe$_4$NCl (0.1 g) | 5 | 63 | 5–8 | 68 | 10 | 11–13 | 2.4–4.0 | 0 |
| 21 | Na$_2$S.9H$_2$O (0.2 g) | H$_2$O (1.6 g) | Pe$_4$NCl (0.1 g) | 1 | 93 | 48 | 47 | 4.5 | 0 | 0 | 0 |
| 22 | Na$_2$S.9H$_2$O (0.2 g) | H$_2$O (1.6 g) | Pe$_4$NCl (0.1 g) | 5 | 63 | 30 | 55 | 8.4 | 4.2 | 1.9 | 0 |
| 23 | Na$_2$S$_2$O$_3$ (0.2 g) | H$_2$O (1.6 g) | Pe$_4$NCl (0.1 g) | 1 | 82 | 56 | 39 | 2.8 | 1.4 | 0 | 0 |
| 24 | Na$_2$S$_2$O$_3$ (0.2 g) | H$_2$O (1.6 g) | Pe$_4$NCl (0.1 g) | 5 | 65 | 28 | 58 | 7.9 | 4.4 | 0 | 1.2 |
| 25 | Na$_2$S$_2$ (0.2 g) | H$_2$O (1.6 g) | Bu$_4$PBr (0.1 g) | 1 | 75 | 37–42 | 49–55 | 5.0 | 2.7 | 0 | 0 |
| 26 | Na$_2$S$_2$ (0.2 g) | H$_2$O (1.6 g) | Bu$_4$PBr (0.1 g) | 5 | 61 | 10–17 | 60–65 | 10 | 7.2–10 | 0 | 2.3–5.1 |
| 27 | (NH$_4$)$_2$S (0.2 g) | H$_2$O (1.6 g) | Bu$_4$PBr (0.1 g) | 1 | 80 | NM | NM | NM | NM | NM | NM |
| 28 | (NH$_4$)$_2$S (0.2 g) | H$_2$O (1.6 g) | Bu$_4$PBr (0.1 g) | 5 | 61 | NM | NM | NM | NM | NM | NM |
| 29 | Na$_2$CS$_3$ (0.2 g) | H$_2$O (1.6 g) | Pe$_4$NCl (0.1 g) | 1 | 76 | 51 | 43 | 3 | 2.1 | 0 | 0 |
| 30 | Na$_2$CS$_3$ (0.2 g) | H$_2$O (1.6 g) | Pe$_4$NCl (0.1 g) | 5 | 71 | 15 | 71 | 9 | 5 | 0 | 0 |
| 31 | Na$_3$PO$_3$S (0.2 g) | H$_2$O (1.6 g) | Bu$_4$PBr (0.1 g) | 1 | 78 | 51 | 42 | 3 | 1.6 | 0 | 0.8 |
| 32 | Na$_3$PO$_3$S (0.2 g) | H$_2$O (1.6 g) | Bu$_4$PBr (0.1 g) | 5 | 62 | 20 | 59 | 9 | 8.1 | 0 | 3.8 |
| 33 | Na$_2$S$_2$O$_3$ (0.2 g) | H$_2$O (1.6 g), MeOH (1.6 g) | Bu$_4$NI (0.1 g) | 10 | NM | 39 | 49 | 53 | 3.8 | 1.2 | 0 |

TABLE 2-continued

| Example | Inorganic Photochemical Electron Donor | Solvent | Cationic Assistant | UV Exposure (minutes) | Advancing Contact Angle on FEP Film (degrees) | Surface Composition (atomic percent) | | | | | |
|---|---|---|---|---|---|---|---|---|---|---|---|
| | | | | | | F | C | O | S | N | P |
| 34 | $Na_2S_2O_3$ (0.2 g) | $H_2O$ (2.0 g), $HOCH_2CH_2OH$ (1.0 g) | $Bu_4PBr$ (0.1 g) | 10 | NM | 27 | 54 | 8.8 | 2.1 | 0 | 2.1 |
| 35 | $Na_2S_2O_3$ (0.1 g), $Na_2S.9H_2O$ (0.1 g) | $H_2O$ (1.6 g) | $Bu_4PBr$ (0.1 g) | 1 | 77 | 36 | 52 | 7 | 3 | 0 | 1.3 |
| 36 | $Na_2S_2O_3$ (0.1 g), $Na_2S.9H_2O$ (0.1 g) | $H_2O$ (1.6 g) | $Bu_4PBr$ (0.1 g) | 5 | 70 | 17 | 60 | 10 | 8 | 0.8 | 4.0 |

Examples 37–95 and Comparative Example D

Examples 37–95 and Comparative Example D were generated according to General Procedure A above, and tested as indicated in Table 3. Table 3 exemplifies some of the various materials and combinations of ingredients that may be used in practice of the process of the invention. Comparative Example A is included in Table 3 for reference purposes.

TABLE 3

| Example | Inorganic Photochemical Electron Donor | Solvent | Cationic Assistant | UV Exposure (minutes) | Adhesion lb/in (N/cm) | Polymer Films Bonded |
|---|---|---|---|---|---|---|
| Comparative Example A | — | — | — | 0 | 0 (0) | FEP/NYL-12 |
| Comparative Example D | — | — | — | 0 | 0 (0) | FEP/EVA |
| 37 | $Na_2S.9H_2O$ (0.2 g) | $H_2O$ (1.6 g) | — | 10 | 3.5 (6.2) | FEP/NYL-12 |
| 38 | $Na_2S_2O_3$ (0.2 g) | $H_2O$ (1.6 g) | — | 10 | 6.0 (11) | FEP/NYL-12 |
| 39 | KSCN (0.2 g) | $H_2O$ (1.6 g), MeOH (1.5 g) | $Bu_4NCl$ (0.1 g) | 10 | 7 (12) | FEP/EVA |
| 40 | KSCN (0.2 g) | $H_2O$ (1.7 g), MeOH (1.7 g) | $Bu_4PBr$ (0.1 g) | 10 | 7 (12) | FEP/EVA |
| 41 | KSCN (0.2 g) | $H_2O$ (1.6 g), MeOH (1.5 g) | $Bu_4NCl$ (0.1 g) | 10 | 12 (21) | FEP/NYL-12 |
| 42 | KSCN (0.2 g) | $H_2O$ (1.7 g), MeOH (1.7 g) | $Bu_4PBr$ (0.1 g) | 10 | 17 (30), tore | FEP/NYL-12 |
| 43 | KSeCN (0.2 g) | MeOH (2.0 g) | $Bu_4PBr$ (0.1 g) | 10 | 7.2 (12) | FEP/EVA |
| 44 | KSeCN (0.2 g) | MeOH (2.0 g) | $Bu_4PBr$ (0.1 g) | 10 | 2 (4) | FEP/NYL-12 |
| 45 | $Na_2CS_3$ (0.2 g) | $H_2O$ (1.6 g) | $Bu_4PBr$ (0.1 g) | 1 | 5 (9) | FEP/NYL-12 |
| 46 | $Na_2CS_3$ (0.2 g) | $H_2O$ (1.6 g) | $Bu_4PBr$ (0.1 g) | 0.5 | 4.5 (8.0) | FEP/NYL-12 |
| 47 | $Na_2S.9H_2O$ (0.2 g) | $H_2O$ (1.6 g) | $Bu_4PBr$ (0.1 g) | 1 | 10 (18) | FEP/NYL-12 |
| 48 | $Na_2S.9H_2O$ (0.2 g) | $H_2O$ (1.6 g) | $Bu_4PBr$ (0.1 g) | 0.5 | 7 (12) | FEP/NYL-12 |
| 49 | $Na_2S.9H_2O$ (0.2 g) | $H_2O$ (1.6 g) | $Bu_4NOH$ (0.1 g) | 1 | 3 (5) | FEP/NYL-12 |
| 50 | $Na_2S.9H_2O$ (0.2 g) | $H_2O$ (1.6 g) | $Bu_4NCl$ (0.1 g) | 1 | 2.5 (4.4) | FEP/NYL-12 |
| 51 | $Na_2S.9H_2O$ (0.2 g) | $H_2O$ (1.6 g) | $Pe_4NCl$ (0.1 g) | 1 | 15 (27) | FEP/NYL-12 |
| 52 | $Na_2S.9H_2O$ (0.2 g) | $H_2O$ (1.6 g) | (n-hexyl)$_4$NBr (0.1 g) | 1 | 6 (11) | FEP/NYL-12 |
| 53 | $Na_2S.9H_2O$ (0.2 g) | $H_2O$ (1.6 g) | (n-heptyl)$_4$NCl (0.1 g) | 1 | 6 (11) | FEP/NYL-12 |
| 54 | $Na_2S.9H_2O$ (0.2 g), $Bu_4NI$ (0.1 g) | $H_2O$ (1.0 g), MeOH (1.0 g) | * | 10 | 6 (11) | FEP/EVA |
| 55 | $Na_2S.9H_2O$ (0.2 g), $Bu_4NI$ (0.1 g) | $H_2O$ (1.0 g), $HOCH_2CH_2OH$ (1.0 g) | * | 5 | 1.4 (2.5) | FEP/EVA |
| 56 | $Na_2S.9H_2O$ (0.2 g), $Bu_4NI$ (0.1 g) | $H_2O$ (1.0 g), MeOH (1.0 g) | * | 10 | 6.5 (12) | FEP/NYL-12 |
| 57 | $Na_2S.9H_2O$ (0.2 g), $Bu_4NI$ (0.1 g) | $H_2O$ (1.0 g), $HOCH_2CH_2OH$ (1.0 g) | * | 5 | 12 (21) | FEP/NYL-12 |
| 58 | $Na_2S.9H_2O$ (0.2 g), $Bu_4NI$ (0.1 g) | $H_2O$ (1.0 g), $HOCH_2CH_2OH$ (1.0 g) | * | 1 | 7 (12) | FEP/NYL-12 |
| 59 | $Na_2S_2$ (0.1 g) | $H_2O$ (1.8 g) | $Bu_4PBr$ (0.1 g) | 0.5 | 9 (16) | FEP/NYL-12 |
| 60 | $Na_2S_2O_3$ (0.2 g) | $H_2O$ (1.6 g), $HOCH_2CH_2OH$ (1.0 g) | $Bu_4PBr$ (0.1 g) | 5 | 5 (9) | FEP/EVA |
| 61 | $Na_2S_2O_3$ (0.2 g) | $H_2O$ (1.6 g), MeOH (1.6 g) | $Bu_4PBr$ (0.1 g) | 10 | 4.5 (8.0) | FEP/EVA |
| 62 | $Na_2S_2O_3$ (0.2 g) | $H_2O$ (1.6 g), $HOCH_2CH_2OH$ (1.0 g) | $Bu_4PBr$ (0.1 g) | 10 | 14.4 (25.5), tore | FEP/EVA |

TABLE 3-continued

| Example | Inorganic Photochemical Electron Donor | Solvent | Cationic Assistant | UV Exposure (minutes) | Adhesion lb/in (N/cm) | Polymer Films Bonded |
|---|---|---|---|---|---|---|
| 63 | $Na_2S_2O_3$ (0.2 g) | $H_2O$ (1.6 g), 3-methoxypropanol (1.0 g) | $Bu_4PBr$ (0.1 g) | 5 | 6.0 (11) | FEP/EVA |
| 64 | $Na_2S_2O_3$ (0.2 g) | $H_2O$ (1.6 g), $HOCH_2CH_2OH$ (1.0 g) | $Bu_4PBr$ (0.1 g) | 10 | 6.0 (11), tore | FEP/EVA |
| 65 | $Na_2S_2O_3$ (0.2 g) | $H_2O$ (1.6 g) | $Et_4NBr$ (0.1 g) | 10 | 2.0 (3.5) | PEP/EVA |
| 66 | $Na_2S_2O_3$ (0.2 g) | $H_2O$ (1.5 g), MeOH (1.5 g) | $Bu_4NCl$ (0.1 g) | 10 | 1.0 (1.8) | FEP/EVA |
| 67 | $Na_2S_2O_3$ (0.2 g) | $H_2O$ (1.6 g), MeOH (1.6 g) | $Bu_4PBr$ (0.1 g) | 10 | 18.4 (32.6), tore | FEP/NYL-12 |
| 68 | $Na_2S_2O_3$ (0.2 g) | $H_2O$ (1.6 g), 3-methoxypropanol (1.0 g) | $Bu_4PBr$ (0.1 g) | 10 | 14 (25), tore | FEP/NYL-12 |
| 69 | $Na_2S_2O_3$ (0.2 g) | $H_2O$ (1.6 g), 3-methoxypropanol (1.0 g) | $Bu_4PBr$ (0.1 g) | 5 | 8.0 (14) | FEP/NYL-12 |
| 70 | $Na_2S_2O_3$ (0.2 g) | $H_2O$ (1.6 g), $HOCH_2CH_2OH$ (1.0 g) | $Bu_4PBr$ (0.1 g) | 10 | 13 (23), tore | FEP/NYL-12 |
| 71 | $Na_2S_2O_3$ (0.2 g) | $H_2O$ (1.6 g), $HOCH_2CH_2OH$ (1.0 g) | $Bu_4PBr$ (0.1 g) | 5 | 10 (18), tore | FEP/NYL-12 |
| 72 | $Na_2S_2O_3$ (0.2 g) | $H_2O$ (1.5 g), MeOH (1.5 g) | $Bu_4NCl$ (0.1 g) | 10 | 5.0 (8.9) | FEP/NYL-12 |
| 73 | $Na_2S_2O_3$ (0.2 g) | $H_2O$ (1.6 g) | $Bu_4PBr$ (0.1 g) | 10 | 10 (18), tore | FEP/NYL-12 |
| 74 | $Na_2S_2O_3$ (0.2 g) | $H_2O$ (1.6 g) | $Bu_4PBr$ (0.1 g) | 2 | 9 (16) | FEP/NYL-12 |
| 75 | $Na_2S_2O_3$ (0.2 g), $Bu_4NI$ (0.03 g) | $H_2O$ (1.5 g), MeOH (1.5 g) | * | 10 | 7.0 (12) | FEP/EVA |
| 76 | $Na_2S_2O_3$ (0.2 g), $Bu_4NI$ (0.03 g) | $H_2O$ (1.5 g), MeOH (1.5 g) | * | 10 | 12.7 (22.5), tore | FEP/NYL-12 |
| 77 | $Na_2S_2O_3$ (0.2 g), $Bu_4NI$ (0.1 g) | $H_2O$ (1.5 g), MeOH (1.5 g) | * | 10 | 7.5 (13) | FEP/EVA |
| 78 | $Na_2S_2O_3$ (0.2 g), $Bu_4NI$ (0.1 g) | $H_2O$ (1.5 g), MeOH (1.5 g) | * | 10 | 11.2 (19.8), tore | FEP/NYL-12 |
| 79 | $Na_2S_2O_3$ (0.1 g), $Na_2S.9H_2O$ (0.1 g) | $H_2O$ (1.6 g) | $Pe_4NCl$ (0.1 g) | 1 | 11 (19) | FEP/NYL-12 |
| 80 | $Na_2S_2O_3$ (0.1 g), $Na_2S.9H_2O$ (0.1 g) | $H_2O$ (1.0 g), $HOCH_2CH_2OH$ (1.0 g) | $Bu_4PBr$ (0.1 g) | 1 | 8 (14) | FEP/NYL-12 |
| 81 | $Na_2S_2O_3$ (0.1 g), $Na_2S.9H_2O$ (0.1 g) | $H_2O$ (1.0 g), $HOCH_2CH_2OH$ (1.0 g) | $(Ph)_4PBr$ (0.1 g) | 2 | 7 (12) | FEP/NYL-12 |
| 82 | $Na_2S_2O_3$ (0.1 g), $Na_2S.9H_2O$ (0.1 g) | $H_2O$ (1.6 g) | (n-hexyl)$_4$NBr (0.1 g) | 1 | 9 (16) | FEP/NYL-12 |
| 83 | $Na_2S_2O_3$ (0.1 g), $Na_2S.9H_2O$ (0.1 g) | $H_2O$ (1.6 g) | $Bu_4NOH$ (conc., 0.1 g) | 1 | 7 (12) | FEP/NYL-12 |
| 84 | $Na_2S_2O_3$ (0.1 g), $Na_2S.9H_2O$ (0.1 g) | $H_2O$ (1.6 g) | (n-heptyl)$_4$NCl (0.1 g) | 1 | 7 (12) | FEP/NYL-12 |
| 85 | $Na_2S_2O_3$ (0.1 g), $Na_2S.9H_2O$ (0.1 g) | $H_2O$ (1.6 g) | (n-octyl)$_4$NCl (0.1 g) | 1 | 8 (14) | FEP/NYL-12 |
| 86 | $Na_2S_2O_3$ (0.1 g), $Na_2S.9H_2O$ (0.1 g) | $H_2O$ (1.6 g) | (n-nonyl)(Me)$_3$NCl (0.1 g) | 1 | 10 (18) | FEP/NYL-12 |
| 87 | $Na_2S_2O_3$ (0.1 g), $Na_2S.9H_2O$ (0.1 g) | $H_2O$ (1.6 g) | (n-dodecyl)(Me)$_3$NCl (0.1 g) | 1 | 6 (11) | FEP/NYL-12 |
| 88 | $Na_2S_2O_3$ (0.1 g), $Na_2S.9H_2O$ (0.1 g) | $H_2O$ (1.6 g) | (n-hexadecyl)(Me)$_3$NCl (0.1 g) | 1 | 1.5 (2.7) | FEP/NYL-12 |
| 89 | $Na_2Se$ (0.2 g) | $HOCH_2CH_2OH$ (2.0 g) | $Bu_4PBr$ (0.1 g) | 2 | 3 (5) | FEP/NYL-12 |
| 90 | $Na_3PO_3S$ (0.2 g) | $H_2O$ (1.6 g) | $Bu_4PBr$ (0.1 g) | 1 | 8 (14) | FEP/NYL-12 |
| 91 | $Na_3PO_3S$ (0.2 g) | $H_2O$ (1.6 g) | $Bu_4PBr$ (0.1 g) | 0.5 | 6 (11) | FEP/NYL-12 |
| 92 | $Na_3PO_3S$ (0.2 g) | $H_2O$ (1.6 g) | $Pe_4NCl$ (0.1 g) | 2 | 11 (19) | FEP/NYL-12 |
| 93 | $Na_3PO_3S$ (0.2 g) | $H_2O$ (1.6 g) | $Pe_4NCl$ (0.1 g) | 0.5 | 6 (11) | FEP/NYL-12 |
| 94 | $K_2C_2O_4$ (0.1 g) | $H_2O$ (1.0 g), $HOCH_2CH_2OH$ (1.0 g) | $Bu_4PBr$ (0.1 g) | 5 | 0.1 (.2) | FEP/NYL-12 |
| 95 | $K_2C_2S_4$ (0.1 g) | $H_2O$ (1.0 g), $HOCH_2CH_2OH$ (1.0 g) | $Bu_4PBr$ (0.1 g) | 5 | 2.2 (3.9) | FEP/NYL-12 |

Examples 96–111

Examples 96–111 were generated according to General Procedure A above, and tested as indicated in Table 4. These results show the use of various sensitizers in practice of the invention. The results in Table 4 show the performance advantage of using a sensitizer.

TABLE 4

| Example | Inorganic Photochemical Electron Donor (*) | Solvent | Sensitizer | UV Exposure (minutes) | Adhesion lb/in (N/cm) | Polymer Films Bonded |
|---|---|---|---|---|---|---|
| 96 | KSCN (0.2 g) | MeCN (2.0 g) | — | 10 | 0.1 | FEP/NYL-12 |
| 97 | $Bu_4NSCN$ (0.2 g) | MeCN (2.0 g) | — | 10 | 0.1 | FEP/EVA |
| 98 | KSCN (0.2 g) | MeCN (2.0 g) | anisole (0.1 g) | 10 | 4.0 (7.1) | FEP/NYL-12 |
| 99 | KSCN (0.2 g) | MeCN (2.0 g) | KB-1 (0.1 g) | 10 | 10 (18) | FEP/NYL-12 |
| 100 | KSCN (0.2 g) | MeCN (2.0 g) | diphenyl sulfide (0.1 g) | 10 | 3.5 (6.2) | FEP/NYL-12 |
| 101 | $Bu_4NSCN$ (0.2 g) | MeCN (2.0 g) | anisole (0.05 g) | 10 | 7.0 (12) | FEP/NYL-12 |
| 102 | $Bu_4NSCN$ (0.2 g) | MeCN (2.0 g) | anisole (0.05 g) | 10 | 5.5 (9.7) | FEP/EVA |
| 103 | $Bu_4NSCN$ (0.2 g) | MeCN (2.0 g) | diphenyl sulfide (0.05 g) | 10 | 2.0 (3.5) | FEP/NYL-12 |
| 104 | $Bu_4NSCN$ (0.2 g) | MeCN (2.0 g) | KB-1 (0.06 g) | 10 | 6.0 (11) | FEP/NYL-12 |
| 105 | $Bu_4NSCN$ (0.2 g) | MeCN (2.0 g) | KB-1 (0.06 g) | 10 | 5.0 (8.9) | FEP/EVA |
| 106 | $Bu_4NSCN$ (0.2 g) | MeCN (2.0 g) | 4,4'-biphenol (0.06 g) | 10 | 11.6 (20.6), tore | FEP/NYL-12 |
| 107 | $Bu_4NSCN$ (0.2 g) | MeCN (2.0 g) | 4,4'-biphenol (0.06 g) | 10 | 1.0 (1.8) | FEP/EVA |
| 108 | $Bu_4NSCN$ (0.2 g) | MeCN (2.0 g) | diphenyl ether (0.1 g) | 10 | 5.0 (8.9), tore | FEP/NYL-12 |
| 109 | $Bu_4NSCN$ (0.2 g) | MeCN (2.0 g) | diphenyl ether (0.1 g) | 10 | 2.0 (3.5) | FEP/EVA |
| 110 | $Bu_4NSCN$ (0.2 g) | MeCN (2.0 g) | styrene (0.1 g) | 10 | 3.5 (6.2), tore | FEP/NYL-12 |
| 111 | $Bu_4NSCN$ (0.2 g) | MeCN (2.0 g) | styrene (0.1 g) | 10 | 3.0 (5.3) | FEP/EVA |

Examples 112–117

Examples 112–117 were generated according to General Procedure A above, and tested as indicated in Table 5. These results show the use of various nitrogen containing electron donors in practice of the invention.

TABLE 5

| Example | Inorganic Photochemical Electron Donor | Solvent | Cationic Assistant | UV Exposure (minutes) | Adhesion lb/in (N/cm) | Polymer Films Bonded |
|---|---|---|---|---|---|---|
| 112 | $NH_4OH$ (conc., 0.2 g) | $H_2O$ (0.5 g), MeOH (1.0 g) | $(Ph)_4PCl$ (0.1 g) | 10 | 6.5 (12) | FEP/NYL-12 |
| 113 | $NH_4OH$ (conc., 0.2 g) | $H_2O$ (0.5 g), MeOH (1.0 g) | $(Ph)_4PCl$ (0.1 g) | 10 | 3.0 (5.3) | FEP/EVA |
| 114 | $NH_2NH_2$ (0.2 g) | $H_2O$ (0.5 g), MeOH (1.0 g) | $(Ph)_4PCl$ (0.1 g) | 10 | 10 (18), tore | FEP/NYL-12 |
| 115 | $NH_2NH_2$ (0.2 g) | $H_2O$ (0.5 g), MeOH (1.0 g) | $(Ph)_4PCl$ (0.1 g) | 10 | 4.5 (8.0) | FEP/EVA |
| 116 | $NaN_3$ (0.2 g) | $H_2O$ (0.5 g), MeOH (1.0 g) | $(Ph)_4PCl$ (0.1 g) | 10 | 10 (18) | FEP/NYL-12 |
| 117 | $NaN_3$ (0.2 g) | $H_2O$ (0.5 g), MeOH (1.0 g) | $(Ph)_4PCl$ (0.1 g) | 10 | 8 (14) | FEP/EVA |

Examples 118–141 and Comparative Example E

Examples 118–141 and Comparative Example E were generated according to General Procedure A above, and tested as indicated in Tables 6 and 7. For the examples listed in Table 7, FEP film, General Procedure A was replaced by THVG film. Table 7 exemplifies various additives to photoreactive solutions that are useful in practice of the invention.

TABLE 6

| Example | Inorganic Photochemical Electron Donor | Solvent | Cationic Assistant | Additive | UV Exposure (minutes) | Adhesion lb/in (N/cm) | Polymer Films Bonded |
|---|---|---|---|---|---|---|---|
| 118 | Bu$_4$NSCN (0.1 g) | MeCN (2.0 g) | * | bis(trimethylsilyloxy)-cyclobutene (0.1 g) | 10 | 3.6 (6.4) | FEP/NYL-12 |
| 119 | Bu$_4$NSCN (0.1 g) | MeCN (2.0 g) | * | bis(trimethylsilyloxy)-cyclobutene (0.1 g) | 10 | 7.5 (13) | FEP/EVA |
| 120 | Na$_2$S$_2$O$_3$ (0.2 g) | H$_2$O (1.0 g), MeOH (1.2 g) | Bu$_4$PBr (0.1 g) | 3-aminopropylsilane (0.1 g) | 5 | 11 (19) | FEP/NYL-12 |
| 121 | Na$_2$S$_2$O$_3$ (0.2 g) | H$_2$O (1.0 g), MeOH (1.2 g) | Bu$_4$PBr (0.1 g) | 3-aminopropylsilane (0.1 g) | 5 | 8.0 (14) | FEP/EVA |
| 122 | Na$_2$S$_2$O$_3$ (0.2 g) | H$_2$O (1.0 g), MeOH (1.2 g) | Bu$_4$PBr (0.1 g) | 2-aminopropanoic acid (0.1 g) | 5 | 8 (14) | FEP/NYL-12 |
| 123 | Na$_2$S$_2$O$_3$ (0.2 g) | H$_2$O (1.0 g), MeOH (1.2 g) | Bu$_4$PBr (0.1 g) | 2-aminopropanoic acid (0.1 g) | 5 | 0.3 (0.5) | FEP/EVA |
| 124 | Na$_2$S$_2$O$_3$ (0.2 g) | H$_2$O (1.0 g), MeOH (1.2 g) | Bu$_4$PBr (0.1 g) | ethylenediamine (0.1 g) | 2 | 6 (11) | FEP/NYL-12 |
| 125 | Na$_2$S$_2$O$_3$ (0.2 g) | H$_2$O (1.0 g), MeOH (1.2 g) | Bu$_4$PBr (0.1 g) | ethylenediamine (0.1 g) | 2 | 4.0 (7.1) | FEP/EVA |
| 126 | Na$_2$S$_2$O$_3$ (0.2 g) | H$_2$O (1.0 g), MeOH (1.2 g) | Bu$_4$PBr (0.1 g) | hydroquinone, (0.1 g) | 2 | 6 (11) | FEP/NYL-12 |
| 127 | Na$_2$S$_2$O$_3$ (0.2 g) | H$_2$O (1.0 g), MeOH (1.2 g) | Bu$_4$PBr (0.1 g) | hydroquinone, (0.1 g) | 2 | 0.2 (0.4) | FEP/EVA |
| 128 | Na$_2$S$_2$O$_3$ (0.2 g) | H$_2$O (1.0 g), MeOH (1.2 g) | Bu$_4$PBr (0.1 g) | hexafluorobisphenol A (0.03 g) | 5 | 12 (21) | FEP/NYL-12 |
| 129 | Na$_2$S$_2$O$_3$ (0.2 g) | H$_2$O (1.0 g), MeOH (1.2 g) | Bu$_4$PBr (0.1 g) | hexafluorobisphenol A (0.03 g) | 5 | 0.2 (0.4) | FEP/EVA |
| 130 | Na$_2$S (0.2 g) | H$_2$O (1.6 g) | Bu$_4$PBr (0.1 g) | 3-aminopropylsilane (0.1 g) | 1 | 8 (14) | FEP/NYL-12 |
| 131 | Na$_3$PO$_3$S (0.2 g) | H$_2$O (1.6 g) | Bu$_4$PBr (0.1 g) | 3-aminopropylsilane (0.1 g) | 2 | 3.5 (6.2) | PFA/NYL-12 |
| 132 | Na$_2$S$_2$O$_3$ (0.1 g), Na$_2$S.9H$_2$O (0.1 g) | H$_2$O (1.6 g) | Bu$_4$PBr (0.1 g) | — | 2 | 6.5 (12) | PFA/NYL-12 |
| 133 | Na$_2$S$_2$O$_3$ (0.1 g), Na$_2$S.9H$_2$O (0.1 g) | H$_2$O (1.6 g) | Bu$_4$PBr (0.1 g) | — | 1 | 10 (18), tore | FEP/NYL-12 |
| 134 | Na$_2$S$_2$O$_3$ (0.1 g), Na$_2$S.9H$_2$O (0.1 g) | H$_2$O (1.6 g) | Bu$_4$PBr (0.1 g) | — | 0.25 | 6 (11) | FEP/NYL-12 |
| 135 | Na$_2$S$_2$O$_3$ (0.1 g), Na$_2$S.9H$_2$O (0.1 g) | H$_2$O (1.6 g) | Bu$_4$PBr (0.1 g) | potassium naphthalenesulfonate | 0.25 | 7 (12) | FEP/NYL-12 |
| 136 | Na$_2$S$_2$O$_3$ (0.1 g), Na$_2$S$_2$ (0.1 g) | H$_2$O (1.6 g) | Bu$_4$PBr (0.1 g) | — | 0.25 | 9 (12) | FEP/NYL-12 |
| 137 | Na$_2$S.9H$_2$O (0.2 g) | H$_2$O (1.6 g) | Bu$_4$PBr (0.1 g) | KOH (0.05 g) | 1 | 10 (18) | FEP/NYL-12 |

TABLE 7

| Example | Inorganic Photochemical Electron Donor | Solvent | Cationic Assistant | Additive | UV Exposure (minutes) | Adhesion lb/in (N/cm) | Polymer Films Bonded |
|---|---|---|---|---|---|---|---|
| Comparative Example E | — | — | — | — | — | 0 (0) | THVG/NYL-12 |
| 138 | Na$_2$S.9H$_2$O (0.2 g) | H$_2$O (1.6 g) | Bu$_4$PBr (0.1 g) | — | 0.5 | 15 (27), tore | THVG/NYL-12 |
| 139 | Na$_2$S.9H$_2$O (0.2 g) | H$_2$O (1.6 g) | Bu$_4$PBr (0.1 g) | KOH (0.05 g) | 1 | 15 (27), tore | THVG/NYL-12 |
| 140 | Na$_2$S$_2$O$_3$ (0.1 g), Na$_2$S.9H$_2$O (0.1 g) | H$_2$O (1.6 g) | Bu$_4$PBr (0.1 g) | — | 2 | 16 (28), tore | THVG/NYL-12 |
| 141 | Na$_2$S$_2$O$_3$ (0.1 g) | H$_2$O (1.6 g) | Bu$_4$PBr (0.1 g) | KOH (0.1 g) | 2 | 15 (27), tore | THVG/NYL-12 |

Comparative Examples F–J

Comparative Examples F–J were carried out according to General Procedure A as indicated in Table 8. Comparative Examples F–J show that sensitizers used in Examples 98–108 do not significantly affect the surface properties of FEP films under the conditions used in those examples.

TABLE 8

| Example | Inorganic Photochemical Electron Donor | Solvent | Sensitizer | UV Exposure (minutes) | Advancing Contact Angle on FEP Film (degrees) | Adhesion lb/in (N/cm) | Polymer Films Bonded |
|---|---|---|---|---|---|---|---|
| Comparative Example F | none | MeCN (2.0 g) | none | 10 | 108 | 0 (0) | FEP/NYL-12 |
| Comparative Example G | none | MeCN (2.0 g) | anisole (0.1 g) | 10 | 108 | 0 (0) | FEP/NYL-12 |
| Comparative Example H | none | MeCN (2.0 g) | diphenyl sulfide (0.1 g) | 10 | 108 | 0 (0) | FEP/NYL-12 |
| Comparative Example I | none | MeCN (2.0 g) | diphenyl ether (0.1 g) | 10 | 107 | 0 (0) | FEP/NYL-12 |
| Comparative Example J | none | MeCN (2.0 g) | KB-1 (0.06 g) | 10 | 107 | 0 (0) | FEP/NYL-12 |

Examples 142–152

Examples 142–152 were carried out according to General Procedure B as indicated in Table 9. These examples show that anionic fluorinated surfactants are ineffective or may even be detrimental when employed in practice of the invention, while fluorinated cationic assistants may be beneficial.

TABLE 9

| Example | Inorganic Photochemical Electron Donor | Solvent | Additive | UV Exposure (minutes) | Adhesion lb/in (N/cm) | Polymer Films Bonded |
|---|---|---|---|---|---|---|
| 142 | $Na_2S.9H_2O$ (0.2 g) | $H_2O$ (1.6 g) | $C_7F_{15}CO_2H$ (0.000125 g) | 40 | 0.1 (0.2) | FEP/NYL-12 |
| 143 | $Na_2S.9H_2O$ (0.2 g) | $H_2O$ (1.6 g) | $C_5F_{11}CO_2H$ (0.0009 g) | 35 | 2.0 (3.5) | FEP/FEP |
| 144 | $Na_2S.9H_2O$ (0.2 g) | $H_2O$ (1.6 g) | $C_4F_9CO_2H$ (0.0015 g) | 35 | 2.5 (4.4) | FEP/FEP |
| 145 | $Na_2S.9H_2O$ (0.2 g) | MeCN (2.0 g) | $Bu_4PBr$ (0.1 g) | 3 | 10 (18), tore | FEP/NYL-12 |
| 146 | $Na_2S.9H_2O$ (0.2 g) | MeCN (2.0 g) | $Bu_4PBr$ (0.1 g), $C_7F_{15}CO_2H$ (0.002 g) | 3 | 6 (11) | FEP/NYL-12 |
| 147 | $Na_2S.9H_2O$ (0.1 g); $Na_2S_2O_3$ (0.1 g) | $H_2O$ (1.6 g) | $H_2N(CH_2)_3Si(OMe)_3$ (0.1 g); $Bu_4PBr$ (0.1 g) | 3 | 10 (18) | FEP/NYL-12 |
| 148 | $Na_2S.9H_2O$ (0.1 g); $Na_2S_2O_3$ (0.1 g) | $H_2O$ (1.6 g) | $H_2N(CH_2)_3Si(OMe)_3$ (0.1 g); $Bu_4PBr$ (0.1 g); $R_f$-onium 1 (0.01 g) | 3 | 7 (12) | FEP/NYL-12 |
| 149 | $Na_2S.9H_2O$ (0.1 g); $Na_2S_2O_3$ (0.1 g) | $H_2O$ (1.6 g) | $H_2N(CH_2)_3Si(OMe)_3$ (0.1 g); $Bu_4PBr$ (0.1 g); $R_f$-onium 2 (0.01 g) | 3 | 10 (18) | FEP/NYL-12 |
| 150 | $Na_2S.9H_2O$ (0.1 g); $Na_2S_2O_3$ (0.1 g); $R_f$-onium 3 (0.01 g, *) | $H_2O$ (1.6 g) | $H_2N(CH_2)_3Si(OMe)_3$ (0.1 g); $Bu_4PBr$ (0.1 g); | 3 | 12 (1.8) | FEP/NYL-12 |

TABLE 9-continued

| Example | Inorganic Photochemical Electron Donor | Solvent | Additive | UV Exposure (minutes) | Adhesion lb/in (N/cm) | Polymer Films Bonded |
|---|---|---|---|---|---|---|
| 151 | $Na_2S.9H_2O$ (0.1 g); $Na_2S_2O_3$ (0.1 g); $R_f$-onium 4 (0.01 g, *) | $H_2O$ (1.6 g) | $H_2N(CH_2)_3Si(OMe)_3$ (0.1 g); $Bu_4PBr$ (0.1 g) | 3 | 3 (5) | FEP/NYL-12 |
| 152 | $Na_2S.9H_2O$ (0.1 g); $Na_2S_2O_3$ (0.1 g); $R_f$-onium 5 (0.008 g, *) | $H_2O$ (1.6 g) | $H_2N(CH_2)_3Si(OMe)_3$ (0.1 g); $Bu_4PBr$ (0.1 g) | 3 | 5.8 (10.3) | FEP/NYL-12 |

Example 153

This example shows modified polymeric substrates of the invention may be electrolessly plated. An FEP film (0.46 millimeter thickness) in contact with an aqueous solution containing 5 wt. % of $Na_2S$, 5 wt. % of $Na_2S_2O_3$, and 5 wt. % of tetrabutylphosphonium bromide was irradiated as in General Procedure A for 5 minutes. The treated surface was activated by immersing it into 0.1 wt. % $PdCl_2$ in water for 1 minute, drying the film, and then immersing in a 0.1M aqueous $NaBH_4$ solution for 1 minute. After removing the film from the $NaBH_4$ solution, the activated film surface was electrolessly plated with nickel by immersing the film for 10 minutes in 100 mL of an aqueous solution containing 4.36 g $NiCl_2.6H_2O$, 2.12 g $NaH_2PO_2.H_2O$, 25.4 g of 50 percent aqueous gluconic acid, 5 mL $NH_4OH$ (conc.), and 2 g NaOH.

Examples 154–156 and Comparative Examples K–L

Examples 154–156 and Comparative Examples K–L were carried out according to General Procedure B as indicated in Table 10. These examples demonstrate surface modification of polyimide and polyester films according to the invention.

TABLE 10

| Example | Inorganic Photochemical Electron Donor | Solvent | Cationic Assistant | UV Exposure (minutes) | Advancing Contact Angle on KHN Film (degrees) | Advancing Contact Angle on BOPP Film (degrees) |
|---|---|---|---|---|---|---|
| Comparative Example K | — | — | — | 0 | 73 | 109 |
| Comparative Example L | — | — | — | 10 | 70 | 109 |
| 154 | $Na_2S.9H_2O$ (0.2 g); $K_2CO_3$ (0.1 g) | $H_2O$ (1.6 g) | $Pe_4NCl$ (0.1 g) | 5 | 42 | NM |
| 155 | $Na_2S.9H_2O$ (0.2 g); $K_2CO_3$ (0.1 g) | $H_2O$ (1.6 g) | $Pe_4NCl$ (0.1 g) | 10 | 30 | NM |
| 156 | $Na_2S.9H_2O$ (0.2 g); $Na_2S_2O_3$ (0.1 g) | $H_2O$ (1.6 g) | $Bu_4NBr$ (0.1 g) | 10 | NM | 55 |

Examples 157 and 158

Examples 157 and 158 were carried out according to General Procedure A as indicated in Table 11, except that ultraviolet fluorescent bulbs (obtained from New England Ultraviolet) having a maximum spectral output at 365 nanometers were used in place of the germicidal bulbs. These examples demonstrate that 365 nanometer radiation is effective, but less effective than 254 nanometer radiation in practice of the invention.

TABLE 11

| Example | Inorganic Photochemical Electron Donor | Solvent | Cationic Assistant | Sensitizer | UV Exposure at 365 Nanometer (minutes) | Advancing Contact Angle on FEP Film (degrees) | Adhesion lb/in (N/cm) | Polymer Films Bonded |
|---|---|---|---|---|---|---|---|---|
| 157 | $Na_2S \cdot 9H_2O$ (0.2 g) | MeOH (1.0 g); $H_2O$ (1.0 g) | $Bu_4NBr$ (0.1 g) | KB-1 (0.03 g) | 60 | 78 | 0.2 (0.4) | FEP/FEP |
| 158 | $Na_2S \cdot 9H_2O$ (0.2 g); $K_2CO_3$ (1.0 g) | MeOH (1.0 g); $H_2O$ (1.0 g) | $Bu_4NBr$ (0.1 g) | $Ph_4NCl$ (0.1 g) | 60 | 85 | 0.1 (0.2) | FEP/FEP |

Various modifications and alterations of this invention will become apparent to those skilled in the art without departing from the scope and spirit of this invention. It therefore should be understood that this invention is not to be unduly limited to the illustrative embodiments set forth above, but is to be controlled by the limitations set forth in the claims and equivalents thereof.

What is claimed is:

1. A process for modifying a polymeric substrate surface comprising:
   a) providing a polymeric substrate comprising a fluoropolymer and having first and second major surfaces;
   b) contacting a photoreactive solution comprising at least one solvent and at least one inorganic photochemical electron donor with the first major surface to form an interface, wherein the second major surface remains substantially uncoated by the photoreactive solution; and
   c) exposing the interface to actinic radiation;
wherein the inorganic photochemical electron donor comprises a soluble non-volatile salt selected from the group consisting of thiocyanate salts, disulfide salts, tetrasulfide salts, thiocarbonate salts, thiooxalate salts, thiophosphate salts, dithionite salts, selenocyanate salts, selenide salts, and azide salts.

2. The process of claim 1, wherein the inorganic photochemical electron donor comprises at least one atom selected from the group consisting of sulfur and nitrogen.

3. The process of claim 1, wherein the soluble non-volatile salt is an alkali metal salt or a guanidinium salt.

4. The process of claim 1, wherein the polymeric substrate is thermoplastic.

5. The process of claim 1, wherein the actinic radiation has a wavelength within the range of from about 240 nanometers to about 300 nanometers.

6. The process of claim 5, wherein the actinic radiation has a wavelength within the range of from about 250 nanometers to about 260 nanometers.

7. The process of claim 5, further comprising the step of bonding the exposed interface to a second substrate.

8. The process of claim 1, wherein the interface is exposed to actinic radiation through the polymeric substrate.

9. The process of claim 1, wherein the interface is exposed to actinic radiation in an image-wise manner.

10. The process of claim 1, wherein the solvent is water.

11. The process of claim 1, wherein the solvent comprises water and at least one organic solvent.

12. The process of claim 1, wherein the photoreactive solution comprises at least one sensitizer.

13. The process of claim 1, further comprising the step of bonding the exposed interface to a second substrate.

14. The process of claim 13, wherein the second substrate is in film form, and wherein the film comprises a polymer selected from the group consisting of a polyamide, a polyolefin, a polyurethane, a polyester, a polyimide, polystyrene, a polycarbonate, a polyketone, a polyurea, an acrylic, and mixtures thereof.

15. The process of claim 1, further comprising the step of bonding the exposed interface to glass.

16. The process of claim 1, wherein the photoreactive solution further comprises a nucleophile.

17. A polymeric substrate having a modified surface prepared according to a process comprising:
   a) providing a polymeric substrate comprising a fluoropolymer and having first and second major surfaces;
   b) contacting a photoreactive solution comprising at least one solvent and at least one inorganic photochemical electron donor with the first major surface to form an interface, wherein the second major surface remains substantially uncoated by the photoreactive solution; and
   c) exposing the interface to actinic radiation;
wherein the inorganic photochemical electron donor comprises a soluble non-volatile salt selected from the group consisting of thiocyanate salts, disulfide salts, tetrasulfide salts, thiocarbonate salts, thiooxalate salts, thiophosphate salts, dithionite salts, selenocyanate salts, selenide salts, and azide salts.

18. The polymeric substrate of claim 17, wherein the inorganic photochemical electron donor comprises at least one atom selected from the group consisting of sulfur and nitrogen.

19. The polymeric substrate of claim 17, wherein the soluble non-volatile salt is an alkali metal salt or a guanidinium salt.

20. The polymeric substrate of claim 17, wherein the polymeric substrate is thermoplastic.

21. The polymeric substrate of claim 17, wherein the actinic radiation has a wavelength within the range of from about 240 nanometers to about 300 nanometers.

22. The polymeric substrate of claim 21, wherein the actinic radiation has a wavelength within the range of from about 250 nanometers to about 260 nanometers.

23. The polymeric substrate of claim 17, wherein the interface is exposed to actinic radiation in an image-wise manner.

24. The polymeric substrate of claim 17, wherein the solvent is water.

25. The polymeric substrate of claim 17, wherein the solvent comprise water and at least one organic solvent.

26. The polymeric substrate of claim 17, wherein the photoreactive solution comprises a sensitizer.

27. The polymeric substrate of claim 17, wherein the polymeric substrate is bonded to a polymer film.

28. The polymeric substrate of claim 25, wherein the polymer film and the polymeric substrate are bonded at the exposed interface.

29. A process for preparing a composite article comprising:
   a) providing a polymeric substrate comprising a fluoropolymer and having a surface;
   b) providing a second substrate having a surface;
   c) coating a photoreactive solution comprising at least one solvent and at least one inorganic photochemical electron donor as a thin film onto the surface of the polymeric substrate to form a first interface;
   d) contacting the surface of the second substrate with the coated photoreactive solution to form a second interface; and
   e) simultaneously exposing the first and second interfaces to actinic radiation sufficient to form a composite article;
wherein the inorganic photochemical electron donor comprises a soluble non-volatile salt selected from the group consisting of thiocyanate salts, disulfide salts, tetrasulfide salts, thiocarbonate salts, thiooxalate salts, thiophosphate salts, dithionite salts, selenocyanate salts, selenide salts, and azide salts.

30. The process of claim 29, wherein the inorganic photochemical electron donor comprises at least one atom selected from the group consisting of sulfur and nitrogen.

31. The process of claim 29, wherein the polymeric substrate is thermoplastic.

32. The process of claim 29, wherein the actinic radiation has a wavelength within the range of from about 240 nanometers to about 300 nanometers.

33. The process of claim 29, wherein the solvent is water.

34. The process of claim 29, wherein the solvent is aqueous organic.

35. The process of claim 29, wherein the photoreactive solution comprises a sensitizer.

36. The process of claim 29, wherein the second substrate is in film form, and wherein the film comprises a polymer selected from the group consisting of a polyamide, a polyolefin, a polyurethane, a polyester, a polyimide, polystyrene, a polycarbonate, a polyketone, a polyurea, an acrylic, and mixtures thereof.

37. The process of claim 29, further comprising heating the composite article while under pressure.

38. The process of claim 29, wherein the photoreactive solution further comprises a nucleophile.

39. A composite article prepared by a process comprising:
   a) providing a polymeric substrate comprising a fluoropolymer and having a surface;
   b) providing a second substrate having a surface;
   c) coating a photoreactive solution comprising at least one solvent and at least one inorganic photochemical electron donor as a thin film onto the surface of the polymeric substrate to form a first interface;
   d) contacting the surface of the second substrate with the coated photoreactive solution to form a second interface; and
   e) simultaneously exposing the first and second interfaces to actinic radiation sufficient to form a composite article;
wherein the inorganic photochemical electron donor comprises a soluble non-volatile salt selected from the group consisting of thiocyanate salts, disulfide salts, tetrasulfide salts, thiocarbonate salts, thiooxalate salts, thiophosphate salts, dithionite salts, selenocyante salts, selenide salts, and azide salts.

40. The composite article of claim 39, wherein the process further comprises heating the exposed interfaces.

41. A polymeric substrate having a modified surface preparable according to a process comprising:
   a) providing a polymeric substrate comprising a fluoropolymer and having a surface;
   b) contacting a photoreactive solution comprising at least one solvent and at least one inorganic photochemical electron donor with the polymeric substrate surface to form an interface; and
   c) exposing the interface to actinic radiation;
wherein the inorganic photochemical electron donor comprises a soluble non-volatile salt selected from the group consisting of thiocyanate salts, disulfide salts, tetrasulfide salts, thiocarbonate salts, thiooxalate salts, thiophosphate salts, dithionite salts, selenocyanate salts, selenide salts, and azide salts.

42. A composite article preparable by a process comprising:
   a) providing a polymeric substrate comprising a fluoropolymer and having a surface;
   b) providing a second substrate having a surface;
   c) coating a photoreactive solution comprising at least one solvent and at least one inorganic photochemical electron donor as a thin film onto the surface of the polymeric substrate to form a first interface;
   d) contacting the surface of the second substrate with the coated photoreactive solution to form a second interface; and
   e) simultaneously exposing the first and second interfaces to actinic radiation sufficient to form a composite article;
wherein the inorganic photochemical electron donor comprises a soluble non-volatile salt selected from the group consisting of thiocyanate salts, disulfide salts, tetrasulfide salts, thiocarbonate salts, thiooxalate salts, thiophosphate salts, dithionite salts, selenocyanate salts, selenide salts, and azide salts.

\* \* \* \* \*

UNITED STATES PATENT AND TRADEMARK OFFICE
CERTIFICATE OF CORRECTION

PATENT NO.   : 6,844,030 B2
DATED        : January 18, 2005
INVENTOR(S)  : Jing, Naiyong It is certified that error appears in the above-identified patent and that said Letters Patent is hereby corrected as shown below:

Title page,
Item [56], References Cited, OTHER PUBLICATIONS,
"D.F." reference, after "Evans" insert -- , --.

Column 5,
Line 67, delete "610x" and insert -- 610X -- in place thereof.

Column 11,
Lines 30-35, delete " $\begin{bmatrix} R^1 \\ R^4-P-R^2 \\ R^3 \end{bmatrix}^{\oplus} X^{\ominus}$ " and insert -- $\begin{bmatrix} R^1 \\ R^4-N-R^2 \\ R^3 \end{bmatrix}^{\oplus} X^{\ominus}$ -- in place thereof.

Column 19,
Line 2, delete "PFA-65 ION" and insert -- PFA-6510N -- in place thereof.

Column 26,
Table 3, Row 3, Col. 7, delete "PEP/EVA" and insert -- FEP/EVA -- in place thereof Column 37,
Line 2, delete "comprise" and insert -- comprises -- in place thereof.

Signed and Sealed this

Seventeenth Day of May, 2005

JON W. DUDAS
*Director of the United States Patent and Trademark Office*